United States Patent
Goldberg

(10) Patent No.: US 11,508,486 B2
(45) Date of Patent: *Nov. 22, 2022

(54) MULTI-NODE, CYCLIC NUCLEAR FUSION REACTOR WITH SINGLE-CYCLE, CHARGED CATHODE

(71) Applicant: Adam S. Goldberg, Redwood City, CA (US)

(72) Inventor: Adam S. Goldberg, Redwood City, CA (US)

(73) Assignee: Adam S. Goldberg, Redwood City, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/943,837

(22) Filed: Jul. 30, 2020

(65) Prior Publication Data
US 2020/0357528 A1 Nov. 12, 2020

Related U.S. Application Data

(63) Continuation of application No. 15/601,980, filed on May 22, 2017, now Pat. No. 10,770,186, which is a
(Continued)

(51) Int. Cl.
*G21B 3/00* (2006.01)
*G21B 1/17* (2006.01)
*G21B 1/19* (2006.01)

(52) U.S. Cl.
CPC .............. *G21B 3/006* (2013.01); *G21B 1/17* (2013.01); *G21B 1/19* (2013.01)

(58) Field of Classification Search
CPC ..... G21B 1/11; G21B 1/17; G21B 1/19; G21B 3/006; G21G 4/02; H05H 1/24; H05H 1/54; H05H 3/06
See application file for complete search history.

(56) References Cited

U.S. PATENT DOCUMENTS 3,258,402 A 2/1960 Farnsworth
3,400,290 A 8/1965 Bergan
(Continued)

FOREIGN PATENT DOCUMENTS

WO    WO 95/26426      10/1995
WO    PCT/US2015/32340  5/2014

OTHER PUBLICATIONS

International Search Report and Written Opinion for PCT/US2015/32340, Goldberg—related case, dated May 26, 2014.
(Continued)

*Primary Examiner* — Sharon M Davis
(74) *Attorney, Agent, or Firm* — Brian S. Boyer; Syndicated Law, PC

(57) ABSTRACT

A controlled fusion process is provided that can produce a sustained series of fusion reactions: a process that (i) uses a substantially higher reactant density of the deuterium and tritium gases by converging cationic reactants into the higher reaction density at a target cathode rather than relying on random collisions, the converging producing a substantially higher rate of fusion and energy production; (ii) uses a substantially lower input of energy to initiate the fusion; (iii) can be cycled at a substantially higher cycle frequency; (iv) has a practical heat exchange method; (v) is substantially less costly to manufacture, operate, and maintain; and, (vi) has a substantially improved reaction efficiency as a result of not mixing reactants with products.

9 Claims, 15 Drawing Sheets

Related U.S. Application Data continuation of application No. 14/720,894, filed on May 25, 2015, now abandoned.

(60) Provisional application No. 62/002,922, filed on May 26, 2014.

(56) References Cited

U.S. PATENT DOCUMENTS

| | | | |
|---|---|---|---|
| 3,386,883 | A | 5/1966 | Farnsworth |
| 3,657,539 | A | 4/1972 | Pierson |
| 4,172,008 | A | 10/1979 | Fleet |
| 4,325,005 | A | 4/1982 | Ab |
| 5,870,447 | A | 2/1999 | Powell et al. |
| 8,576,971 | B2 | 11/2013 | Sefcik |
| 10,770,186 | B2 | 9/2020 | Goldberg |
| 2006/0267504 | A1 | 11/2006 | Van Drie et al. |
| 2008/0226010 | A1 | 9/2008 | Sesselmann |
| 2011/0091000 | A1 | 4/2011 | Stubbers et al. |
| 2011/0096885 | A1 | 4/2011 | Leung et al. |
| 2012/0097532 | A1 | 4/2012 | Deluze |
| 2013/0058446 | A1 | 3/2013 | Zheng |
| 2013/0287156 | A1 | 10/2013 | Yazdanbod |
| 2015/0340105 | A1 | 11/2015 | Goldberg |

OTHER PUBLICATIONS

Boyle, A. How Lockheed Martin's power play could boost fervor over fusion. [online] URL: http://www.nbcnews.com/science/science-news/how-lockheed-martins-power-play-could-boost-fervor-over-fusion-n227366 [published Oct. 16, 2014; retrieved Jun. 16, 2015].
Cartlidge, E. Fusion Energy Pushed back beyond 2050. BBC News. (2017).
Clynes, T. The boy who played with fusion. [online] URL: http://www.popsci.com/science/article/2012-02/boy-who-played-fusion?page=all 1/[retrieved Jun. 16, 2015; posted Feb. 14, 2012].
Electricalfun. Building a fusion reactor in a basement workshop. WorkbenchFun. URL: http://www.electricalfun.com/WorkbenchFun/Fusor_William_Jack.aspx [retrieved Sep. 13, 2019].
Ion Beam Technology Group, Lawrence Berkeley National Laboratory. Neutron and Gamma Generators. [online] URL: http://ibt.lbl.gov/neutrongamma.html (downloaded Jun. 29, 2016).
Kelhacker, M. et al. High Fusion Performance from Deuterium-Tritium Plasmas in JET. Nuclear Fusion (1998).
Lawson, J. D. Some Criteria for a Power Producing Thermonuclear Reaction. Proc. Phys. Soc. 870: pp. 6-10 (1957).
Lindl, J. Development of the indirect-drive approach to inertial confinement fusion and the target physics basis for ignition and gain. Phys. Plasmas 2(11): 3933-4024 (1995).
LLNL, Diamond capsules produce promising results, [online] URL: https://lasers.llnl.gov/news/papers-presentations/2015/february [published Feb. 4, 2015; retrieved Jun. 16, 2015].
LLNL, Igniting our energy future, [online] URL: https://str.llnl.gov/JulAug11/dunne.html [published Jul./Aug. 2011; retrieved Jun. 16, 2015].
LLNL, NIF Users, Research opportunities at the National Ignition Facility, [online] URL: https://lasers.llnl.gov/for-users [published 2014; retrieved Jun. 16, 2015].
LLNL, Physics world names National Ignition Facility fuel gain top 10 breakthroughs of the year [online] URL: https://www.llnl.gov/news/physics-world-names-national-ignition-facility-fuel-gain-top-10-breakthrough-year [published Dec. 15, 2014; retrieved Jun. 16, 2015].
Qian, L.Q. et al., High density plasma deposition and deep submicron gap fill with low dielectric constant SiOF films. 1995 proceedings First International Dielectrics for VLSI/ULSI Multilevel Interconnection Conference: a specialty conference of 1995 VLSI Multi-level Interconnection Conference, DUMIC Catalog No. 95ISMIC-101D:p. 50 (Feb. 21-25, 1995, Santa Clara Marriott Hotel, Santa Clara, CA).
Quora, How much kinetic energy is needed for a tritiumdeuterium fusion and aneutronic fusion? [online] URL: https://www.quora.com/How-much-kinetic-energy-is-needed-for-a-tritium-deuterium-fusion-and-aneutronic-fusion [retrieved Aug. 22, 2019].
Roth, A. (ed.), Vacuum Technology. Third, Updated and Enlarged Edition. Elsevier Science Publishers B.V.:202 (1990).
Scharping, N. Why Nuclear Fusion Is Always 30 Years Away. Discover Magazine (2016).
Seife, C. Sun in a Bottle. New York: Penguin Group, Inc. Chapter 10: 220-227 (2008).
Spangler, D. Learn How to Build a Nuclear Fusor [online] URL: https://makezine.com/projects/make-36-boards/nuclear-fusor/ [retrieved Sep. 13, 2019].
Wikipedia, Atomic nucleus, [online] URL: https://en.wikipedia.org/wiki/Atomic_nucleus [retrieved Jun. 16, 2015].
Wikipedia, Bose-Einstein condensate, [online] URL: https://en.wikipedia.org/wiki/Bose%E2%80%93Einstein_condensate [retrieved Jun. 16, 2015].
Wikipedia, Fusion power, [online] URL: https://en.wikipedia.org/wiki/Fusion_power [retrieved Jun. 16, 2015].
Wikipedia, Fusor, [online] URL: https://en.wikipedia.org/wiki/Fusor [retrieved Jun. 16, 2015].
Wikipedia, Inertial electrostatic confinement, [online] URL: https://en.wikipedia.org/wiki/Inertial_electrostatic_confinement [retrieved Jun. 16, 2015].
Wikipedia, ITER, [online] URL: https://en.wikipedia.org/wiki/ITER [retrieved Jun. 16, 2015].
Wikipedia, Magnetic confinement fusion, [online] URL: https://en.wikipedia.org/wiki/Magnetic_confinement_fusion [retrieved Jun. 16, 2015].
Wikipedia, Neutron generator, [online] URL: https://en.wikipedia.org/wiki/Neutron_generator [retrieved on Jun. 29, 2016].
Wikipedia, Reactor pressure vessel, [online] URL: https://en.wikipedia.org/wiki/Reactor_pressure_vessel [retrieved Jun. 16, 2015].
Wikipedia, Sputter deposition, [online] URL: https://en.wikipedia.org/wiki/Sputter_deposition [retrieved Jun. 16, 2015].
Wikipedia, Thermoelectric generator, [online] URL: https://en.wikipedia.org/wiki/Thermoelectric_generator [retrieved Jun. 16, 2015].
Wikipedia, Tokamak, [online] URL: https://en.wikipedia.org/wiki/Tokamak [retrieved Jun. 16, 2015].
Wikipedia, World energy consumption, [online] URL: https://en.wikipedia.org/wiki/World_energy_consumption [retrieved Jun. 16, 2015].

PRIOR ART

PRIOR ART

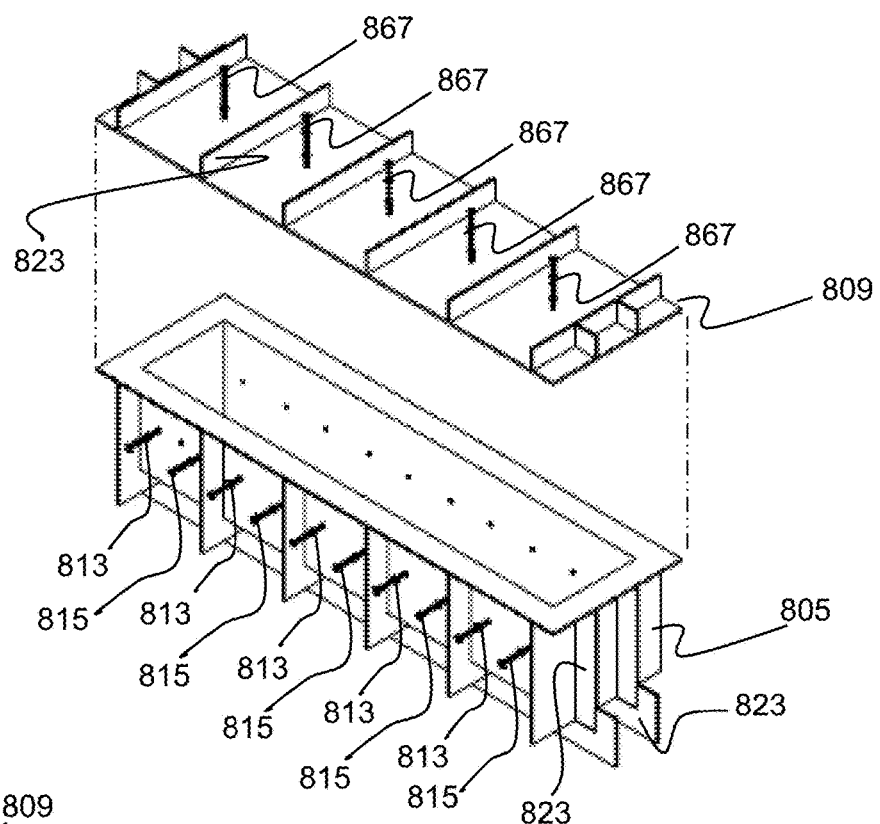
FIG. 9A
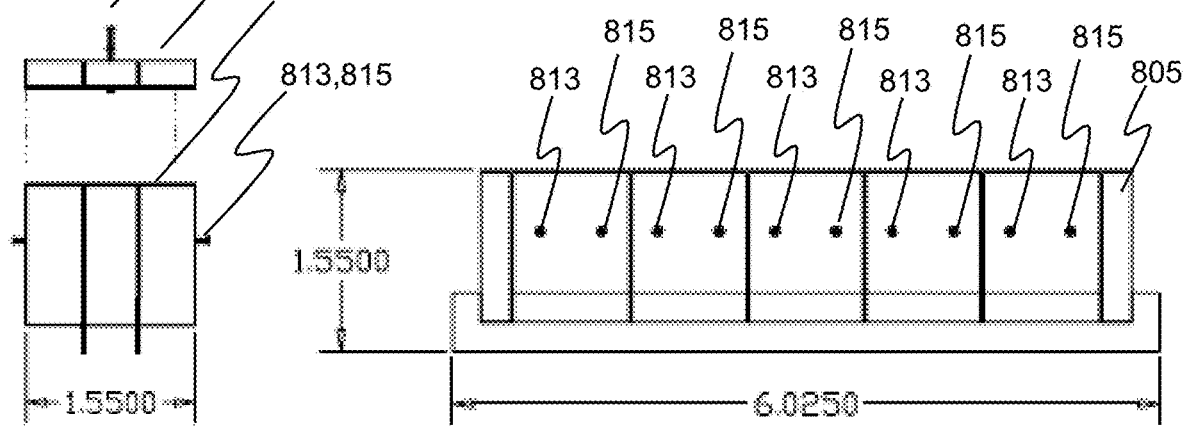
FIG. 9B
FIG. 9C
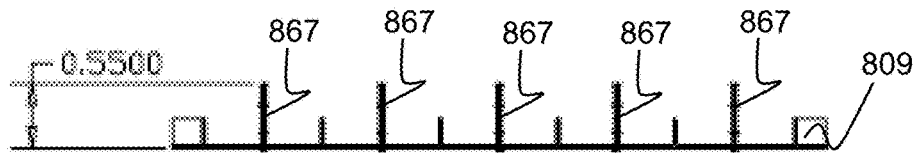
FIG. 9D

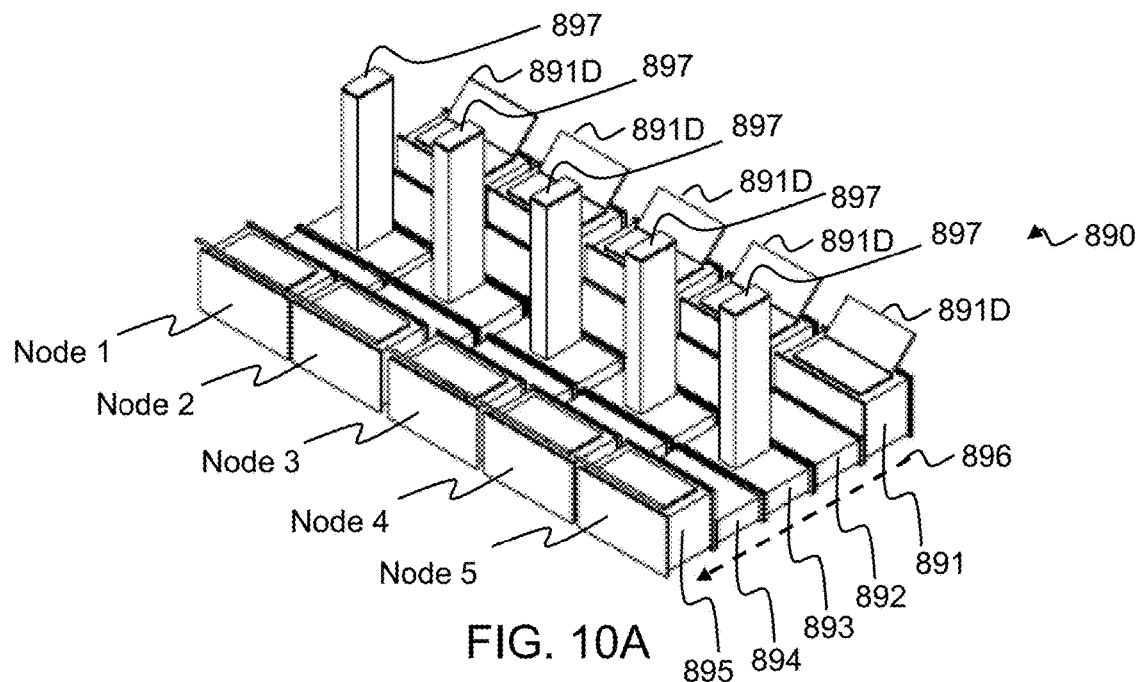
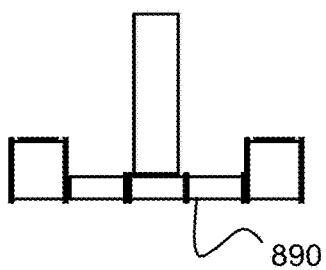
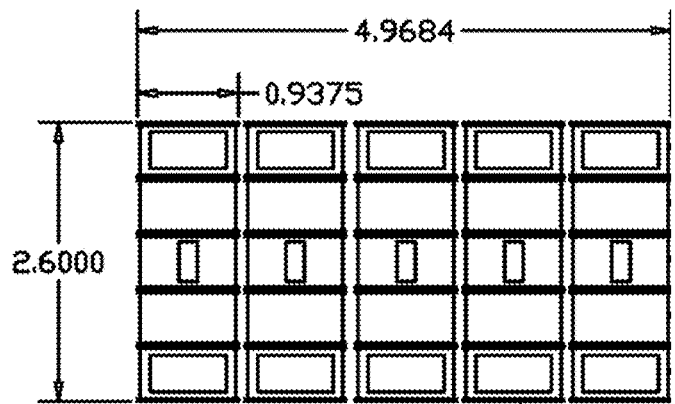
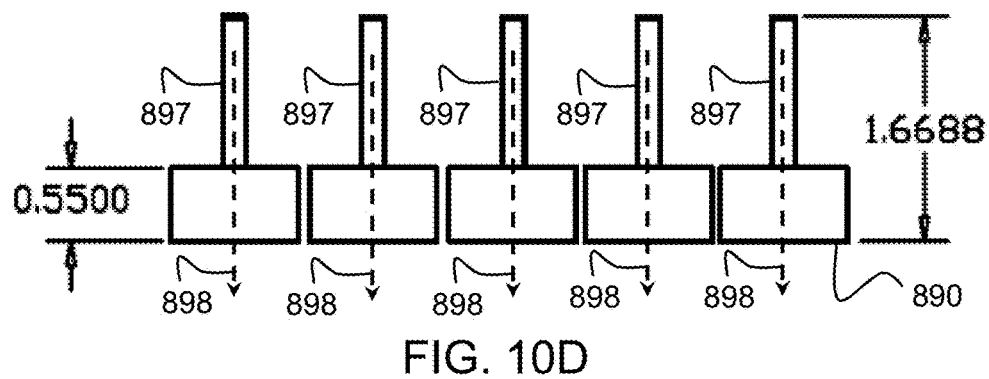
FIG. 10A
FIG. 10B
FIG. 10C
FIG. 10D

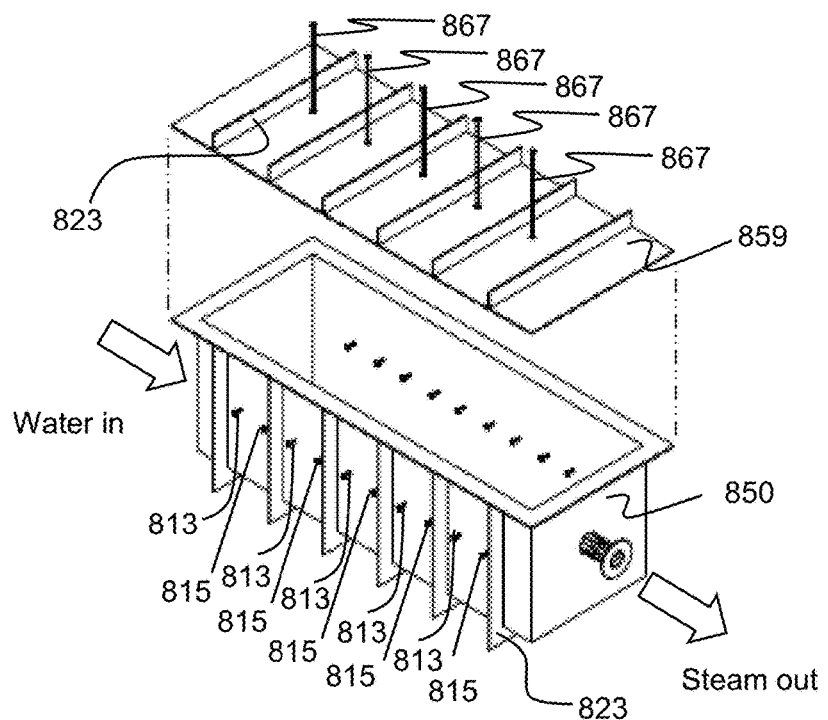
FIG. 12A
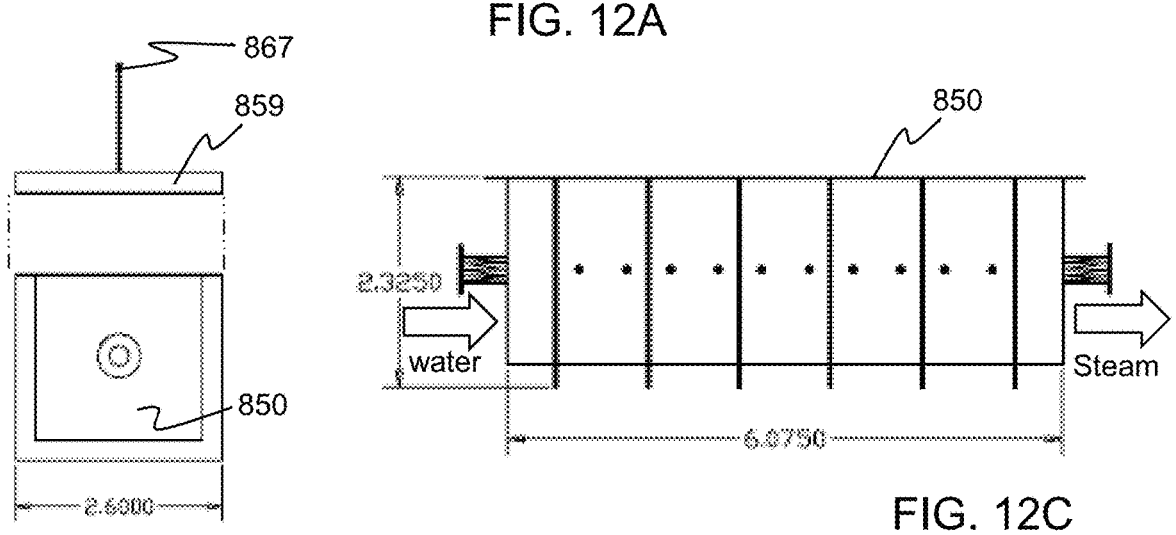
FIG. 12B
FIG. 12C
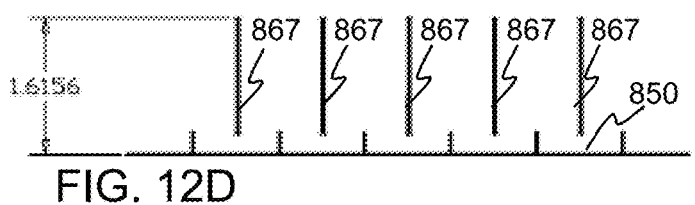
FIG. 12D

MULTI-NODE, CYCLIC NUCLEAR FUSION REACTOR WITH SINGLE-CYCLE, CHARGED CATHODE

CROSS-REFERENCE TO RELATED APPLICATIONS

This application is a continuation of U.S. application Ser. No. 15/601,980, filed May 22, 2017, which is a continuation of U.S. application Ser. No. 14/720,894, filed May 25, 2015, which claims the benefit of U.S. Provisional Application No. 62/002,922, filed May 26, 2014, each of which is hereby incorporated herein by reference in its entirety.

BACKGROUND

Field of the Invention

The teachings provided herein are generally directed to systems and methods for obtaining nuclear fusion energy using a high energy charged particle convergence at a target cathode to increase the amount of fusion energy produced in a single fusion cycle.

Description of the Related Art

Most will agree that our world needs better sources of energy, source that are more efficient and would reduce the threat to the environment created by our current energy sources. In fact, most will agree that an uncompromising new energy architecture/paradigm is required to allow continued societal development and to avoid habitat and species loss. Current energy usage rewards a small minority of the population to the disadvantage of the majority and environmental quality. The combustion of carbon based fuels (coal, oil, natural gas) is still used primarily worldwide and still produces deleterious environmental effects in the form of elevated $CO_2$ concentrations that is polluting our world and causing at least atmospheric warming and ocean chemistry changes. Ultimately, a future should be planned that addresses these issues as opposed to continued reliance on a strict capitalistic theory that will inevitably fail to meet the range of societal and environmental needs. An inexhaustible energy source will provide a basis for an economic structure that can be controlled without short-term tradeoffs that can be politically instituted.

Many consider the possibility of the nuclear fusion power plant to be the best answer to the problem. One reason is that nuclear fusion is theoretically more efficient, requiring only about one millionth of the mass of fuel needed to produce the same amount of energy as a coal operating power plant. Another reason is that the fuel sources for nuclear fusion would be virtually unlimited, as these fuels are readily available. Another reason that nuclear fusion is desirable is that it doesn't suffer from diseconomies of scale—water and wind energy, for example, suffer from diseconomies as the optimal locations are used up and only less optimal locations remain, in addition to the fact that wind and water sources can vary, whereas fusion reactant sources remain reliable, as they are continuous, consistent, and abundant. Finally, it is believed that the nuclear fusion would offer a much safer process. For at least these reasons, the goal of producing fusion power to produce electricity has been pursued for decades and has been met with many problems that have not been solved; for example, there is still no controlled fusion process that can produce a sustained series of fusion reactions.

FIGS. 1A and 1B illustrate nuclear fusion between deuterium and tritium, according to some prior art embodiments. As shown in FIG. 1A, the fusion between a first reactant that is deuterium, $^2H$, with a second reactant that is tritium, $^3H$, creates helium-4, $^4He$. The fusion also frees a neutron and releases 17.59 MeV of energy as heat. FIG. 1B shows the electrostatic force between the positively charged, cationic reactants, deuterium and tritium.

FIGS. 2A and 2B illustrate state-of-the-art nuclear fusion reactors, according to some prior art embodiments. FIG. 2A illustrates a laser inertial fusion energy (LIFE) system 200 in which fusion 205 takes place in an evacuated 12 meter diameter steel chamber 210. Sixteen times a second, a 2 millimeter diameter target of deuterium-tritium fuel 215 is injected into the chamber, each target containing only about 0.7 mg of tritium, and each day about 1.3 million targets can be injected into the LIFE system 200 at a velocity of about 250 meters per second. And, the LIFE system 200 delivers 2 megajoule (MJ), 351 nanometer laser 230 pulses to indirect-drive fusion targets 215. The repeated fusion 205 reactions heat a lithium blanket surrounding the chamber, and the heat 220 generated, typically at about 600° C., is used to drive a steam turbine generator (not shown) to produce up to 1500 megawatts of baseload electricity from each plant. The chamber is filled with xenon gas 225 to protect the chamber 210 from ions and x-rays that are generated by the fusion 205 process in addition to the helium-4, $^4He$, and heat energy. Unfortunately, this technology has not been successfully scaled to produce a power plant, as the system is limited to use of a low reactant density of the deuterium and tritium gases which produces only random collisions and, thus, a low production of energy. Moreover, an unreasonably high energy is required to initiate the fusion, the system can only be cycled at a slow cycle frequency due to target loading and laser charging limitations, and there is no practical heat exchange method. It is a costly and inefficient system that leaves costly reactants unreacted due to the low reaction densities inherent to the design.

FIG. 2B illustrates an international thermonuclear experimental reactor (ITER) system 250 in which fusion takes place in a donut-shaped vacuum vessel called a tokamak 260. An electromagnet (not shown) conducts electricity through the center of the tokamak 260 to produce a voltage (not shown) across gas reactants deuterium, $^2H$, and tritium, $^3H$, that have been injected 265 in the tokamak 260, the voltage ripping electrons from the deuterium, $^2H$, and tritium, $^3H$, to ionize the deuterium, $^2H$, and tritium, $^3H$, into cationic reactants. The ionized, cationic reactants form a plasma 270. Magnetic coils 275 are used to compress and confine the plasma 270 to keep it away from the walls of the tokamak 260 and protect the tokamak 260 from the high temperatures that are developed in the plasma. The magnetic coils 275 also generate a current in the plasma 270, heating it to 10 million° C. which, unfortunately, is still not hot enough for fusion to occur. To raise the temperature to 100-200 million° C., which is hot enough for fusion to occur, radiowaves and microwaves 280 are fired into the plasma. Unfortunately, this technology has not been successfully scaled to produce a power plant, and the system is also limited to the use of deuterium and tritium gases at a low reactant density which produces a low reaction rate and low production of energy. In addition, an especially problematic condition is that the reaction products are not removed but, rather, mix with the reactants and slow the reaction rate. Moreover, cycling of the process is impractical due to the large volume of the system which demands a long pump-out time. As with the LIFE system 200, there is no practical heat exchange method in the ITER system 250, and the ITER system 250 is costly to manufacture, maintain, and operate due to its complexity and inefficiencies. Although there are theoretical designs for a reactor that is hoped to deliver ten times more fusion energy than the amount needed to heat up the plasma 270 to the required temperatures for fusion to occur, the ITER facility is still not expected to finish its construction phase until at least 2019 and is not expected to begin full deuterium-tritium fusion until at least 2027.

Given the above, it should be appreciated that those of skill will appreciate a controlled fusion process that can produce a sustained series of fusion reactions. Namely, a process that (i) uses a substantially higher reactant density of the deuterium and tritium gases by converging cationic reactants into the higher reaction density at a target cathode rather than relying on random collisions, the converging producing a substantially higher rate of fusion and energy production; (ii) uses a substantially lower input of energy to initiate the fusion; (iii) can be cycled at a substantially higher cycle frequency; (iv) has a practical heat exchange method; (v) is substantially less costly to manufacture, operate, and maintain; and, (vi) has a substantially improved reaction efficiency as a result of not mixing reactants with products.

SUMMARY

The teachings provided herein are generally directed to systems and methods for obtaining nuclear fusion energy using a high energy charged particle convergence at a target cathode to increase the amount of fusion energy produced in a single fusion cycle. Namely, the teachings provide a controlled fusion process that can produce a sustained series of fusion reactions: a process that (i) uses a substantially higher reactant density of the deuterium and tritium gases by converging cationic reactants into the higher reaction density at a target cathode rather than relying on random collisions, the converging producing a substantially higher rate of fusion and energy production; (ii) uses a substantially lower input of energy to initiate the fusion; (iii) can be cycled at a substantially higher cycle frequency; (iv) has a practical heat exchange method; (v) is substantially less costly to manufacture, operate, and maintain; and, (vi) has a substantially improved reaction efficiency as a result of not mixing reactants with products.

For example, the teachings include a method of producing an at least substantially continuous electrical energy from a cyclized nuclear fusion reaction, comprising evacuating a reaction chamber to a pressure that is lower than about $10^{-3}$ torr; inducing a pulse of (i) a first reactant into the evacuated reaction chamber through a first reactant port and a pulse of (ii) a second reactant into the evacuated reaction chamber through a second reactant port; and, converging the first reactant with the second reactant at a target cathode for colliding and fusing the first reactant with the second reactant to create a heat energy. The converging can include, for example, creating an electrical field in the reaction chamber by applying a voltage across an anode surface positioned in the interior of the reaction chamber and a cathode surface positioned in the interior of the reaction chamber, the electric field ionizing the first reactant to generate a cationic first reactant and ionizing the second reactant to generate a cationic second reactant. In addition, the converging can include establishing a negative charge on the target cathode for attracting and converging the cationic first reactant and the cationic second reactant at the target cathode for colliding and fusing the cationic first reactant with the cationic second reactant to create the heat energy.

The method can include transferring the heat energy to a steam vessel to drive a turbine to create an electrical energy. The method can be cyclic by replacing the target cathode with a replacement target cathode to complete a first cycle of the nuclear fusion method; and, repeating the evacuating, inducing, applying, converging, transferring, and replacing for n additional cycles of the nuclear fusion method, wherein n is an integer that produces an at least substantially continuous electrical energy from the nuclear fusion reaction.

One of skill will appreciate that the first reactant and second reactant can be any reactant useful in producing a fusion reaction using the methods and systems taught herein. For example, the first reactant and second reactant can each be independently selected from the group consisting of deuterium, tritium, and helium-3, boron-11, lithium-6, and a proton, in some embodiments. In some embodiments, the first reactant and the second reactant are independently selected from the group consisting of deuterium, tritium, and helium. In some embodiments, the first reactant is deuterium and the second reactant is tritium. In some embodiments, the first reactant is deuterium and the second reactant is deuterium. In some embodiments, the first reactant is tritium and the second reactant is tritium. In some embodiments, the first reactant is deuterium and the second reactant is helium-3. In some embodiments, the first reactant is helium-3 and the second reactant is helium-3. In some embodiments, the first reactant is a proton and the second reactant is boron-11. And, in some embodiments, the first reactant is a proton and the second reactant is lithium-6.

One of skill will appreciate that the pressure in the reaction chamber can be varied to any pressure that one of skill will find useful in the methods and systems provided herein. For example, the pressure in the evacuated reaction chamber can range from about $10^{-4}$ torr to about $10^{-9}$ torr in some embodiments, and from about $10^{-6}$ torr to about $10^{-9}$ torr in some embodiments.

The teachings are also directed to a system that can be used in practicing the methods taught herein. For example, the teachings include a system for producing an at least substantially continuous electrical energy from a cyclized nuclear fusion reaction. In some embodiments, the system comprises a reaction vessel having a reaction chamber configured for evacuation of the chamber to a pressure that is lower than about $10^{-3}$ torr; a vacuum port adapted for an operable connection to a vacuum source for evacuating the reaction chamber to a pressure that is lower than about $10^{-3}$ torr; a first injector in operable communication with a first reactant port in the evacuated reaction chamber for inducing a pulse of a first reactant into the evacuated reaction chamber through the first reactant port; a second injector in operable communication with a second reactant port in the evacuated reaction chamber for inducing a pulse of a second reactant into the evacuated reaction chamber through the second reactant port; an anode surface and a cathode surface for operably connecting to a voltage source, the anode surface and the cathode surface positioned in the interior of the reaction chamber to create an electric field in the evacuated reaction chamber upon application of a voltage, the electric field ionizing the first reactant to generate a cationic first reactant and ionizing the second reactant to generate a cationic second reactant; a target cathode positioned in the reaction chamber at a first distance from the first injector and a second distance from the second injector, the target cathode configured to function as a negatively charged electrode for attracting and converging the cationic first reactant and the cationic second reactant at the target cathode for colliding and fusing the cationic first reactant with the cationic second reactant to create a heat energy; a steam chamber in operable contact with the reaction chamber, the steam chamber configured for receiving the heat energy from the fusion reaction in the reaction chamber.

One of skill will also appreciate that the first reactant port and the second reactant port can include a configured nozzle, designed for a particular embodiment. For example, nozzle flow design can be varied to change the shape and speed of the first reactant from the first reactant port and the shape and speed of the second reactant from the second reactant port. In some embodiments, the pulse of the first reactant or the pulse of the second reactant is applied as a convergent flow on the target electrode. In some embodiments, the pulse of the first reactant or the pulse of the second reactant is applied as a divergent flow on the target electrode. And, in some embodiments, the pulse of the first reactant or the pulse of the second reactant is applied as a fan pattern on the target electrode.

It should also be appreciated that the nozzle design can be independently selected for each of the first injector and the second injector. For example, the first injector can be configured for injecting deuterium and the second injector can be configured for injecting tritium. The first injector can be configured for injecting deuterium and the second injector can be configured for injecting deuterium. The first injector can be configured for injecting tritium and the second injector can be configured for injecting tritium.

Likewise, one of skill will appreciate that the reaction chamber can be configured to operate at any pressure that one of skill will find useful in the methods and systems provided herein. For example, the reaction chamber can be configured to operate in the pressure range from about $10^{-4}$ torr to about $10^{-9}$ torr in some embodiments, and from about $10^{-6}$ torr to about $10^{-9}$ torr in some embodiments.

One of skill will appreciate that the positioning of the first reactant port, the second reactant port, and the target cathode can be adjusted to vary the first distance between the first reactant port and the target cathode and the second distance between the second reactant port and the target electrode. In some embodiments, the first distance and the second distance are at least substantially the same. In some embodiments, the first distance and the second distance are varied to calibrate and synchronize the collision between the cationic first reactant and the cationic second reactant. Likewise, one of skill will also appreciate that the negative charge on the target cathode can be varied to calibrate and synchronize the collision between the cationic first reactant and the cationic second reactant. Moreover, one of skill can vary the first distance, the second distance, and the charge on the target cathode to calibrate and synchronize the collision between the cationic first reactant and the cationic second reactant.

One of skill will appreciate that the size of the target cathode can be varied for any of a variety of operational considerations. In some embodiments, for example, the target electrode can have an area ranging from about from about $1.00 \times 10^{-10}$ m$^2$ to about $1.00 \times 10^{-6}$ m$^2$.

One of skill will appreciate that the target cathode can be constructed of a variety of different materials. For example, the target cathode can be any conducting material. In some embodiments, the target cathode can comprise a metal. In some embodiments, for example, the target cathode can be comprised of aluminum, an aluminum alloy, or copper. In some embodiments, the target cathode can be comprised of a metal selected from the group consisting of aluminum, antimony, barium, bismuth, boron, carbon (e.g., amorphous, diamond, graphene, graphite), cadmium, calcium, chromium, cobalt, copper, gold, iridium, iron, lead, magnesium, manganese, mercury, molybdenum, nickel, platinum, potassium, rhenium, silver, sodium, steel, tantalum, tellurium, tin, titanium, tungsten, uranium, vanadium, zinc, and alloys thereof. The target cathode can comprise a semiconductor or conductive polymer, in some embodiments.

In some embodiments, one or more shields can be used to protect the first reactant port and the second reactant port from the heat and/or products of the fusion reaction. As such, in some embodiments, the systems can further comprise a shield between the first injector and the target electrode, between the second injector and the target electrode, or a combination thereof.

BRIEF DESCRIPTION OF THE FIGURES

FIGS. 9A-9F shows a multi-node, high vacuum reactor chamber having reactant injector ports for each node, and an insulated target electrode used in each node, according to some embodiments.

FIGS. 10A-10D illustrate a target load/switch-out assembly with cassettes providing replacement target electrodes, according to some embodiments.

FIGS. 12A-12D illustrate a steam chamber for capturing and moving nuclear fusion energy in the form of steam to a steam turbine to create electricity, according to some embodiments.

DETAILED DESCRIPTION

Systems and methods are provided herein for obtaining nuclear fusion energy using a high energy charged particle convergence at a target cathode to increase the amount of fusion energy produced in a single fusion cycle.

Namely, a controlled fusion process is provided that can produce a sustained series of fusion reactions: a process that (i) uses a substantially higher reactant density of the deuterium and tritium gases by converging cationic reactants into the higher reaction density at a target cathode rather than relying on random collisions, the converging producing a substantially higher rate of fusion and energy production; (ii) uses a substantially lower input of energy to initiate the fusion; (iii) can be cycled at a substantially higher cycle frequency; (iv) has a practical heat exchange method; (v) is substantially less costly to manufacture, operate, and maintain; and, (vi) has a substantially improved reaction efficiency as a result of not mixing reactants with products.

Figure 3A:
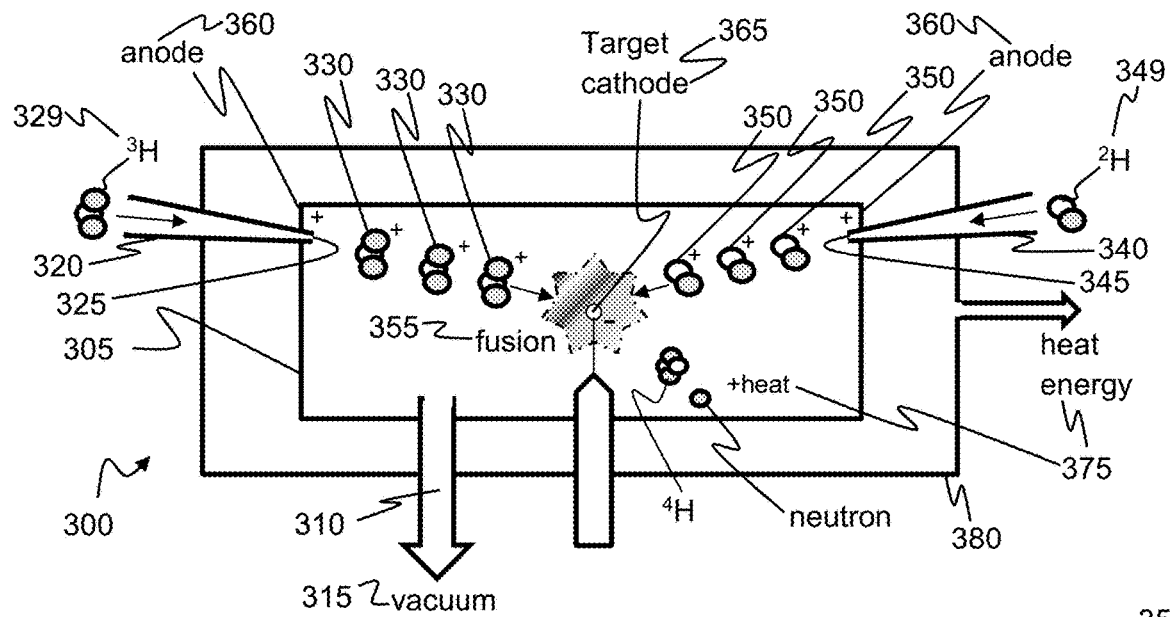
FIGS. 3A and 3B illustrate a system and method for obtaining nuclear fusion energy using a high energy charged particle collision, according to some embodiments.
Figure 3B:
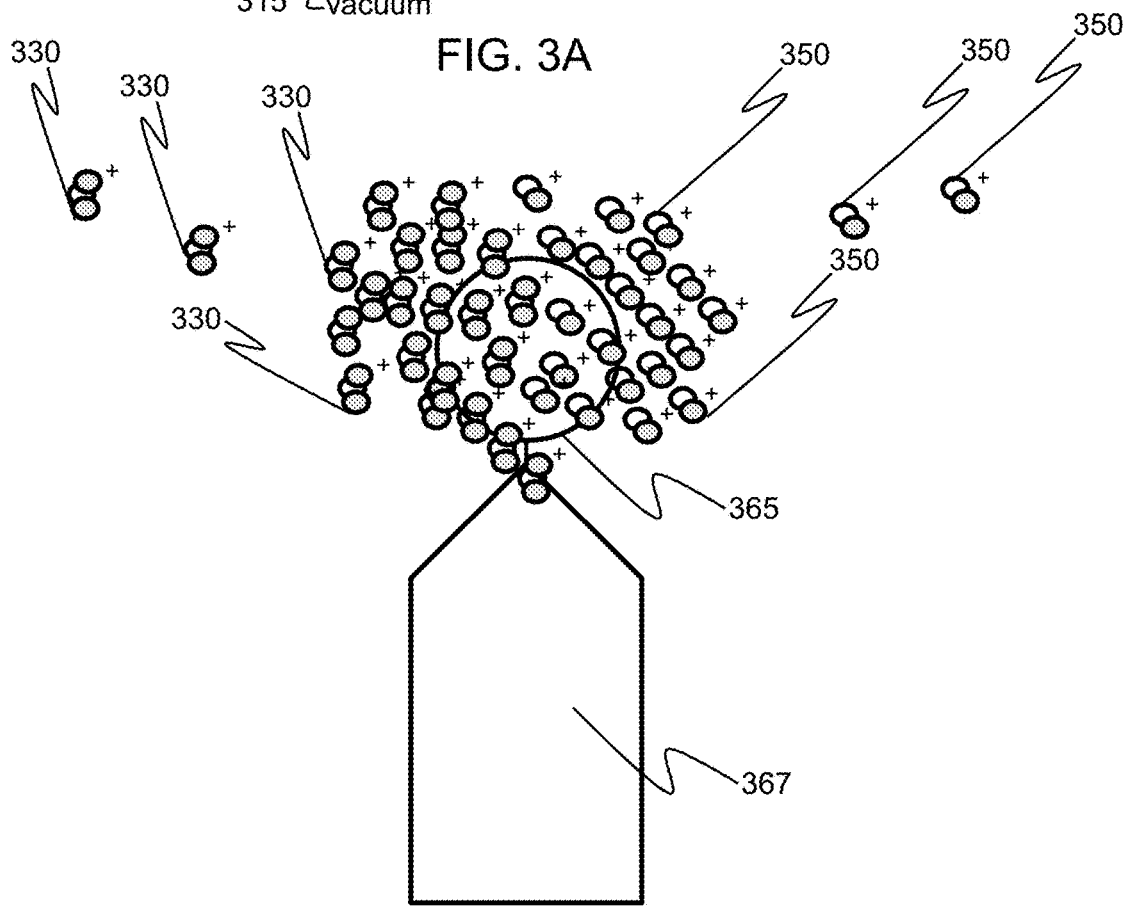

FIGS. 3A and 3B illustrate a system for obtaining nuclear fusion energy using a high energy charged particle collision, according to some embodiments. In some embodiments, the systems and methods can produce an at least substantially continuous electrical energy from a cyclized nuclear fusion reaction. As shown in FIG. 3A, the system can comprise a reaction vessel 300 having a reaction chamber 305 configured for evacuation of the chamber 305 to a pressure that is lower than about $10^{-3}$ torr; a vacuum port 310 adapted for an operable connection to a vacuum source 315 for evacuating the reaction chamber 305 to a pressure that is lower than about $10^{-3}$ torr; a first injector 320 in operable communication with a first reactant port 325 in the evacuated reaction chamber 305 for inducing a pulse of a first reactant, tritium ($^3$H) 329 into the evacuated reaction chamber 305 through the first reactant port 325; a second injector 340 in operable communication with a second reactant port 345 in the evacuated reaction chamber 305 for inducing a pulse of a second reactant 349, deuterium ($^2$H) into the evacuated reaction chamber 305 through the second reactant port 345; an anode surface 360 and a cathode surface 365 for operably connecting to a voltage source (not shown), the anode surface 360 and the cathode surface 365 positioned in the interior of the reaction chamber 305 to create an electric field in the evacuated reaction chamber 305 upon application of a voltage 360,365, the electric field ionizing the first reactant 329 to generate a cationic first reactant 330 and ionizing the second reactant 349 to generate a cationic second reactant 350; a target cathode 365 positioned in the reaction chamber 305 at a first distance (distance between 325 and 365) from the first injector 325 and a second distance (distance between 345 and 365) from the second injector 340, the target cathode 365 configured to function as a negatively charged electrode for attracting and converging the cationic first reactant 330 and the cationic second reactant 350 at the target cathode 365 for colliding and fusing the cationic first reactant 330 with the cationic second reactant 350 to create a heat energy; a steam chamber 380 in operable contact with the reaction chamber 305, the steam chamber 380 configured for receiving the heat energy 375 from the fusion 355 reaction in the reaction chamber 305. The voltage applied to attract and converge the cationic reactants 330,350 at the target cathode 365 can be referred to as the "bias", in some embodiments, indicating the use of voltage to generate a force to transport the cationic reactants 330,350 to the target cathode 365 for the collision and fusion.

FIG. 3B provides an enlarged view of the target cathode 365 and it's insulator 367. The cationic first reactant 329, tritium ($^3$H) and the cationic second reactant 329, deuterium ($^2$H) are shown as attracted and converging to the target cathode 365 for colliding and fusing to create the heat energy 375. As opposed to the random distribution and random collision present in current state of the art fusion technologies, the systems and methods provided herein substantially increase the reactant density, and fusion rate, when compared to the current state of the art fusion technologies. In some embodiments, each of the reactant density and fusion rate can be said that it is "substantially greater than" a state-of-the-art process, or can be referred to as "substantially increasing" over a state-of-the-art process, when it increases by about 2×, about 3×, about 5×, about 10×, about 15×, about 20×, about 25×, about 30×, about 40×, about 50×, about 60×, about 70×, about 80×, about 90×, about 100×, about 200×, about 300×, about 400×, about 500×, about 600×, about 700×, about 800×, about 900×, or any amount therein in increments of 1×. Likewise, in some embodiments, each of the reactant density and fusion rate can be said that it is "substantially greater than" a state-of-the-art process, or can be referred to as "substantially increasing" over a state-of-the-art process, when it increases by about $10^3$, about $10^4$, about $10^5$, about $10^6$, about $10^7$, about $10^8$, about $10^9$, about $10^{10}$, about $10^{11}$, about $10^{12}$, about $10^{13}$, about $10^{14}$, about $10^{15}$, or any amount therein in increments of $0.500 \times 10^3$. The reactant density and fusion rate can be measured and compared to a state-of-the-art process in any manner known to one of skill to provide an acceptable comparable measure. For example, the exothermicity of the fusion output, the energy produced, normalized to the amount of reactants injected, can provide an acceptable comparable measure of at least fusion rate, and possibly an indirect comparable measure of reactant density, in some embodiments. Likewise the electricity produced from a steam turbine that uses the energy from the fusion to produce electrical power per, based on a normalization of the amount of reactants injected, can provide an acceptable comparable measure of at least fusion rate, and possibly an indirect comparable measure of reactant density, in some embodiments. The efficiency of the process can also be considered in the comparable measures, for example, perhaps to further normalize the comparisons to further compare the instant systems and methods to the current state-of-the-art using reaction efficiency, cost efficiency, and the like. One of skill can use any metric that is considered acceptable in the art to compare the instant systems and methods to the current state-of-the-art, for example, the ITER system or the LIFE system.

The small size and negative charge of the target focuses the convergence of the reactants. It should be appreciated that the surface area of the target cathode can be varied as a process variable in order to adjust, for example the reaction density, rate of reaction, and/or energy produced by the fusion reaction. One of skill will appreciate that any area that works with the principles of the teachings provided herein can be used. In some embodiments, the surface area of the target can be defined as the front and back surface only, disregarding the surface on the edge of the target. In some embodiments, the target cathode can have any configuration that serves to attract the first reactant and the second reactant in a convergent manner to at least one point of collision.

In some embodiments, there is more than one point of collision and, in some embodiments, there are many points, areas, or planes of collision such as more than 3, more than 5, more than 10, more than 20, more than 50, more than 100, and so on. The number of points of collision can be a variable selected to increase the operation efficiency of the system. For example, in some embodiments, the target cathode can be in the form of a scaffolding, cage, or mesh structure each carrying a negative charge on areas that represent a variety of planes for collision, as opposed to a planar structure with, perhaps, two primary planar surfaces carrying a negative charge, such as the target cathode disc shown in FIG. 3B. The target cathode disc shown in FIG. 3B has a front planar surface, a back planar surface, and a small surface around the circumference of the disc. As the charged particles approach the disc from different directions, attracted by the negative charge, the angles of their approaches to impinge on the charged surface of the disc are highly variable. A basket, screen, or mesh target cathode may facilitate the impingement of the cationic reactants from just about any angle of impingement on the target cathode that may occur in the reaction chamber. Moreover, reactants can come close to the target cathode and miss it, and a cage-type structure, or a structure having even more charged surfaces in layers, may facilitate a higher efficiency of impingement of the cationic reactants on the target cathode. In some embodiments, a cage can be any shape desired, such as a spherical cage, ellipsoid cage, cubical cage, polyhedral cage, conical cage, cylindrical cage and the like. The cage can be used as a second component in combination with a primary target cathode, for example, in combination with the disc-shaped cathode in FIG. 3B. The primary cathode in FIG. 3B, for example, can have a cylindrical or conical cathode cage added to both sides of the primary target cathode to help capture, confine or focus the beams of reactants approaching the primary target cathode. Such a secondary component can carry a positive charge to help focus the cationic reactants toward the cathode, in some embodiments.

In some embodiments, the area of the target can be on the surface of a disc, a sphere, an ellipsoid, cube, polyhedron, and the like, as well as the same or similar shapes but manufactured using screen or mesh materials to provide several conductive surfaces in the form of a scaffolding, cage, or basket, for example, that can be approached from about any angle of impingement that may occur from a reactant. In some embodiments, the surface area can range from about $1.3648 \times 10^{-10}$ m$^2$ to about $1.3648 \times 10^{-6}$ m$^2$, from about $1.3648 \times 10^{-9}$ m$^2$ to about $1.3648 \times 10^{-7}$ m$^2$, from about $1.00 \times 10^{-10}$ m$^2$ to about $1.00 \times 10^{-6}$ m$^2$, about $1.3648 \times 10^{-8}$ m$^2$, about $1.00 \times 10^{-8}$ m$^2$, about $10^{-11}$ m$^2$, $10^{-10}$ m$^2$, $10^{-9}$ m$^2$, $10^{-8}$ m$^2$, $10^{-7}$ m$^2$, $10^{-6}$ m$^2$, $10^{-5}$ m$^2$, or any range therein.

One of skill will appreciate that the voltage between an anode surface and a cathode surface in the systems and methods can be varied and are selected to be large enough to (i) create a sufficient electric field to ionize the reactants, (ii) overcome the like-charge repulsion to enable the first reactant and the second reactant to collide sufficiently for fusion, and (iii) drive the convergence of the reactants to create the high reactant density at the target cathode and measured as the average density over the entire surface area of the target cathode. As such, in some embodiments, where the voltage is between the target cathode and an anode surface and is sufficiently large enough to create the convergence of the reactants towards the target cathode and the force of collision required for the fusion between the first reactant and the second reactant. Likewise, the voltage between the target cathode and the anode surface can also be used in the creation of the electric field, in some embodiments, to ionize the first reactant and the second reactant into cationic first reactant and cationic second reactant, respectively. In some embodiments, the voltage can range from about 10 kV to about 30 MV, from about 15 kV to about 30 MV, from about 20 kV to about 30 MV, from about 30 kV to about 30 MV, from about 15 kV to about 25 MV, from about 15 kV to about 20 MV, from about 10 kV to about 10 MV, from about 15 kV to about 10 MV, from about 15 kV to about 5 MV, from about 40 kV to about 5 MV, from about 50 kV to about 5 MV, from about 100 kV to about 5 MV, from about 250 kV to about 5 MV, from about 500 kV to about 5 MV, from about 500 kV to about 2 MV, from about 1 MV to about 5 MV, from about 1 MV to about 3 MV, from about 1 MV to about 2 MV, or any range of voltages therein in increments of 1 kV. In some embodiments, the voltage can be about 10 kV, about 11 kV, about 12 kV, about 13 kV, about 14 kV, about 15 kV, about 20 kV, about 25 kV, about 30 kV, about 35 kV, about 40 kV, about 45 kV, about 50 kV, about 60 kV, about 70 kV, about 80 kV, about 90 kV, about 100 kV, about 200 kV, about 300 kV, about 400 kV, about 500 kV, about 600 kV, about 700 kV, about 800 kV, about 900 kV, about 1 MV, about 2 MV, about 3 MV, about 4 MV, about 5 MV, about 10 MV, about 15 MV, about 20 MV, about 25 MV, about 30 MV, or any voltage therein, or range of voltages therein, in increments of 1 kV. In some embodiments, the voltage is greater than about 15 kV, greater than about 20 kV, greater than about 25 kV, greater than about 30 kV, greater than about 35 kV, greater than about 40 kV, greater than about 45 kV, greater than about 50 kV, or greater than any kV between 15 kV and 50 kV in increments of 1 kV. The kV can be constant, or it can be varied, in the operation of a system or method taught herein. Variable frequency electric fields can also be used. In some embodiments, a variable frequency field can be used, for example, to increase the ionization efficiency of the ionization step to create the cationic reactants.

Given the teachings of the systems and methods provided herein, it should also be appreciated that the design is adapted to provide a substantially higher reactant density than currently provided by the state-of-the-art. And, one of skill will appreciate that, as the reactant density increases, the energy output of the system will substantially increase per cycle over the current state-of-the-art processes, and the total energy output of the system will likewise substantially increase over the current state-of-the-art processes.

Figure 1A:
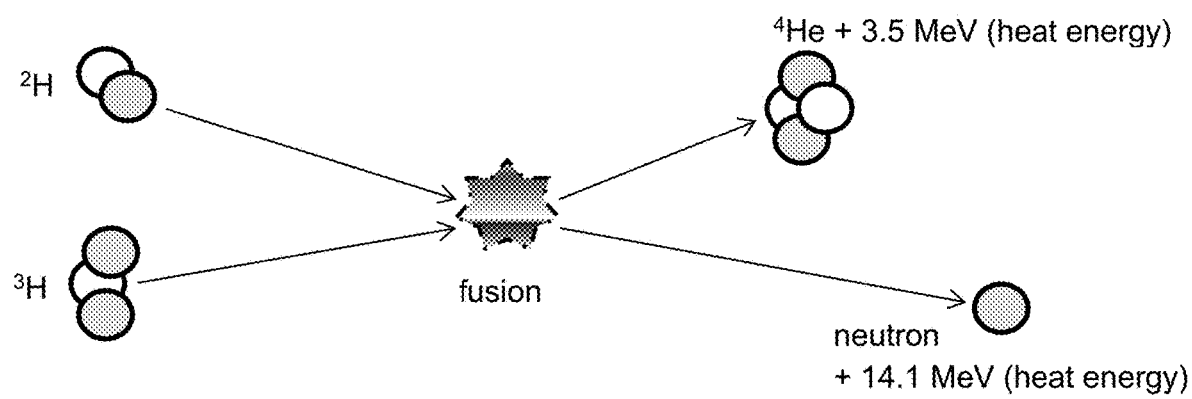
FIGS. 1A and 1B illustrate nuclear fusion between deuterium and tritium, according to some prior art embodiments.
Figure 1B:
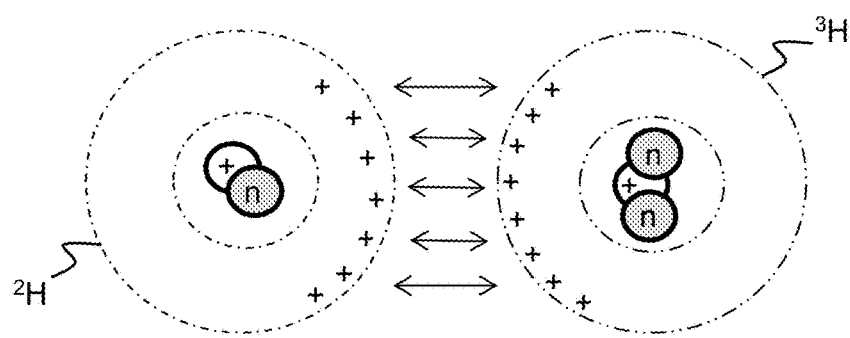
Figure 2A:
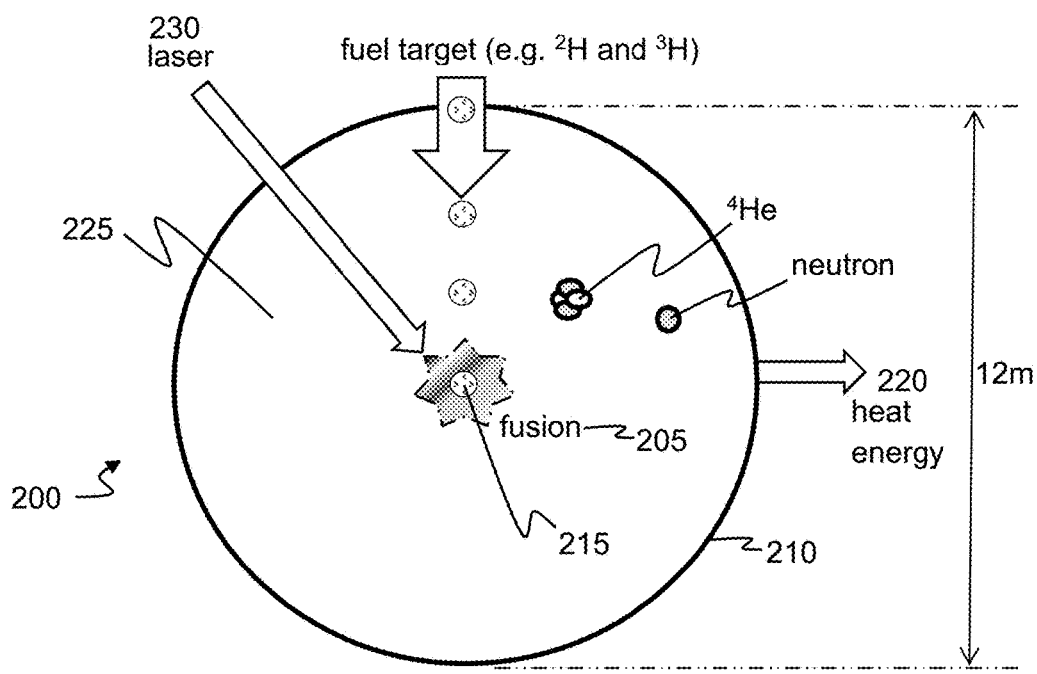
FIGS. 2A and 2B illustrate state-of-the-art nuclear fusion reactors, according to some prior art embodiments.
Figure 2B:
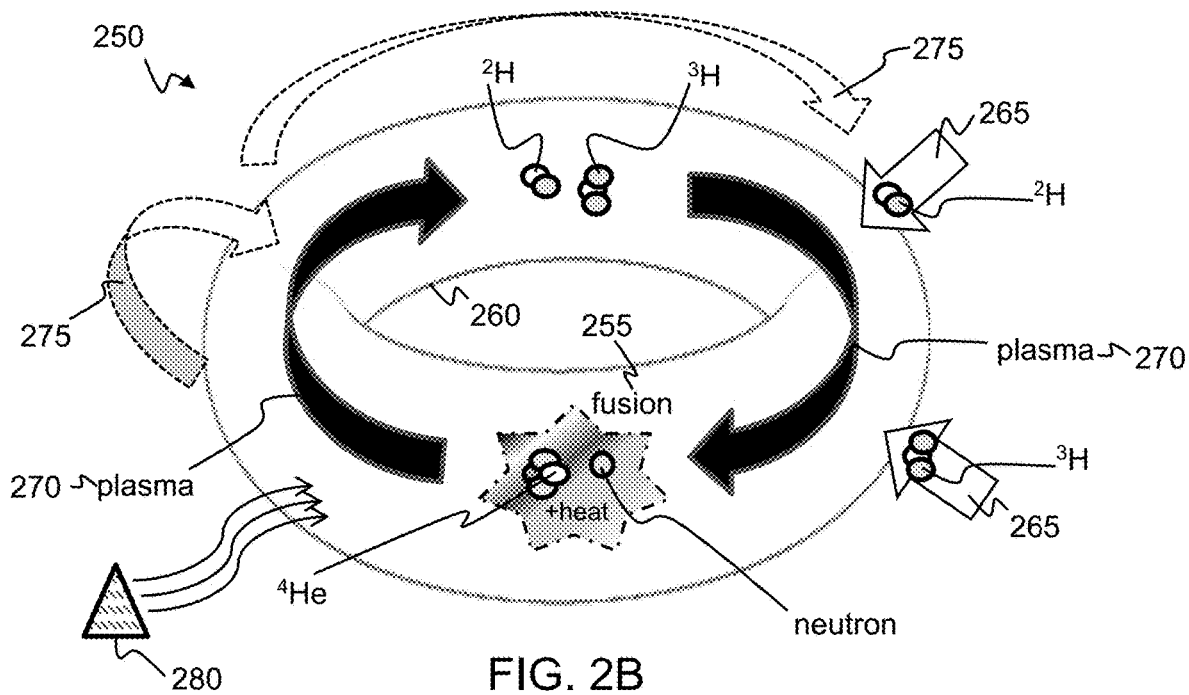

The substantially higher performance of the systems and methods taught herein over the current state-of-the-art processes can be established in any manner considered acceptable to one skilled in the art. In some embodiments, for example, the reactant density can represent mass/volume and can range from about $1.5 \times 10^3$ g/cm$^3$ to about $1.5 \times 10^{10}$ g/cm$^3$ normalized as an average reactant density over the entire surface of the target electrode. In some embodiments, the reactant density can range from about $1.5 \times 10^5$ g/cm$^3$ to about $1.5 \times 10^{10}$ g/cm$^3$ normalized as an average reactant density over the entire surface of the target electrode. In some embodiments, the reactant density can range from about $1.5 \times 10^8$ g/cm$^3$ to about $1.5 \times 10^{10}$ g/cm$^3$ normalized as an average reactant density over the entire surface of the target electrode. In some embodiments, the reactant density can range from about $1.5466 \times 10^{10}$ g/cm$^3$ normalized as an average reactant density over the entire surface of the target electrode. This is a very significant, surprising and unexpected increase in reactant density over the current state-of-the-art, as the LIFE system (See FIG. 2A) has a reactant density of only about 1000 g/cm$^3$, according to some measures.

In some embodiments, the substantially higher reactant density of the instant systems and methods as compared to the current state-of-the-art processes can be represented by using a measure of the monolayer of nuclei that converge on the surface of the target cathode. In some embodiments, for example, the monolayer reactant density can range from about $10^3$ nuclei/m$^2$ to about $10^{29}$ nuclei/m$^2$ normalized as an average monolayer reactant density over the entire surface of the target electrode. In some embodiments, for example, the monolayer reactant density can range from about $10^4$ nuclei/m$^2$ to about $10^{29}$ nuclei/m$^2$ normalized as an average monolayer reactant density over the entire surface of the target electrode. In some embodiments, for example, the monolayer reactant density can range from about $10^5$ nuclei/m$^2$ to about $10^{28}$ nuclei/m$^2$ normalized as an average monolayer reactant density over the entire surface of the target electrode, or any range therein. In some embodiments, for example, the monolayer reactant density can be about $10^3$ nuclei/m$^2$, $10^4$ nuclei/m$^2$, $10^5$ nuclei/m$^2$, $10^6$ nuclei/m$^2$, $10^7$ nuclei/m$^2$, $10^8$ nuclei/m$^2$, $10^9$ nuclei/m$^2$, $10^{10}$ nuclei/m$^2$, $10^{11}$ nuclei/m$^2$, $10^{12}$ nuclei/m$^2$, $10^{13}$ nuclei/m$^2$, $10^{14}$ nuclei/m$^2$, $10^{15}$ nuclei/m$^2$, $10^{16}$ nuclei/m$^2$, $10^{17}$ nuclei/m$^2$, $10^{18}$ nuclei/m$^2$, $10^{19}$ nuclei/m$^2$, $10^{20}$ nuclei/m$^2$, $10^{21}$ nuclei/m$^2$, $10^{22}$ nuclei/m$^2$, $10^{23}$ nuclei/m$^2$, $10^{24}$ nuclei/m$^2$, $10^{25}$ nuclei/m$^2$, $10^{26}$ nuclei/m$^2$, $10^{27}$ nuclei/m$^2$, $10^{28}$ nuclei/m$^2$, $10^{29}$ nuclei/m$^2$, or any range within these values, each monolayer reactant density normalized as an average monolayer reactant density over the entire surface of the target electrode. In some embodiments, for example, the monolayer reactant density be about $5.2 \times 10^{28}$ nuclei/m$^2$ normalized as an average monolayer reactant density over the entire surface of the target electrode.

One of skill will appreciate that the reactor should be made of a material that takes into consideration the high temperatures and pressures present from the nuclear fusion reaction. Any material that meets this criteria can be used. For example, the reaction chamber can be made of steel. Moreover, the stresses in the system can be reduced by operating under steady state conditions where possible to avoid inducing unnecessary thermal stresses in the materials. It should also be appreciated that most any component of the systems and methods taught herein can be subject to his criteria, and in particular those materials that form a part of the reaction chamber.

Methods of using such systems are also provided herein. The methods can comprise, for example, evacuating the reaction chamber 305 to a pressure that is lower than about $10^{-3}$ torr; inducing a pulse of (i) the first reactant 329 into the evacuated reaction chamber 305 through a first reactant port 325 and a pulse of (ii) a second reactant 348 into the evacuated reaction chamber 305 through the second reactant port 345; and, converging the first reactant 329 with the second reactant 349 at the target cathode 365 for colliding and fusing 355 the first reactant 329 with the second reactant 349 to create the heat energy 375. The converging can include, for example, creating an electrical field in the reaction chamber by applying a voltage (not shown) across the anode surface 360 positioned in the interior of the reaction chamber 305 and the cathode surface 365 positioned in the interior of the reaction chamber 305, the electric field ionizing the first reactant 329 to generate the cationic first reactant 330 and ionizing the second reactant 349 to generate the cationic second reactant 350. In addition, the converging can include establishing a negative charge on the target cathode 365 for attracting and converging the cationic first reactant 330 and the cationic second reactant 350 at the target cathode 365 for colliding and fusing 355 the cationic first reactant 330 with the cationic second reactant 350 to create the heat energy 375. The methods will generally include transferring the heat energy 375 to a steam vessel 380 to drive a turbine (not shown) to create an electrical energy.

One of skill will appreciate that there are several variations possible in the implementation of these process steps in series. Table 1 is illustrative of some of the variations.

TABLE 1

| Step | Embodiment 1 | Embodiment 2 | Embodiment 3 | Embodiment 4 |
|---|---|---|---|---|
| 1 | Valve Open | Voltage induced | Voltage induced | Valve Open |
| 2 | Gas leaves manifold | Valve Open | Valve Open | Gas leaves manifold |
| 3 | Voltage induced | Gas leaves manifold | Gas leaves manifold | Voltage induced |
| 4 | Ionize gas | Ionize gas | Valve closes | Ionize gas |
| 5 | Gas accelerates to target | Gas accelerates to target | Ionize gas | Gas accelerates to target |
| 6 | Gas hits target | Gas hits target | Gas accelerates to target | Gas hits target |
| 7 | Fusion occurs | Fusion occurs | Gas hits target | Fusion occurs |
| 8 | Produce $^4$He and energy | Produce $^4$He and energy | Fusion occurs | Produce $^4$He and energy |
| 9 | $^4$He is evacuated | $^4$He is evacuated | Produce $^4$He and energy | Valve closes |
| 10 | Valve closes | Valve closes | $^4$He is evacuated | $^4$He is evacuated |
| 11 | Manifolds fill | Manifolds fill | Manifolds fill | Manifolds fill |

One of skill will appreciate that the primary steps of the methods taught herein will often include (i) inducing a pulse of the first reactant, (ii) inducing a pulse of the second reactant; (iii) ionizing the first reactant and the second reactant; (iv) converging the first reactant and the second reactant on the target cathode; and (v) collecting heat energy from the fusion reaction. Processes of cycling the fusion reaction include the step of evacuating the $^4$He from the reaction chamber. The possible variations around these primary steps are, of course, numerous in many embodiments, and understood as mere process variations by those of skill.

The method can be cyclic by replacing the target cathode with a replacement target cathode to complete a first cycle of the nuclear fusion method; and, repeating the evacuating, inducing, applying, converging, transferring, and replacing for n additional cycles of the nuclear fusion method, wherein n is an integer that produces an at least substantially continuous electrical energy from the nuclear fusion reaction. One of skill will appreciate that the number of cycles that can be run is a process variable that can depend on materials used to construct the reaction vessel and, thus the operational constraints of the reaction vessel, operational constraints of peripheral components, the preventative maintenance schedule set for the equipment, and the like. As such, assuming at least the fusion rate of the LIFE system which is 1,382,400 fusions/day (16 fusions/second) and a shutdown for repairs no more than once per quarter, n can be about 124,416,000 cycles for a single reactor. In some embodiments, n can range from about 10 to about 10,000,000,000 cycles for a single reactor. In some embodiments, n can range from about 100 to about 1,000,000,000 cycles for a single reactor. In some embodiments, n can range from about 1000 to about 100,000,000 cycles for a single reactor. In some embodiments, n can range from about 10,000 to about 10,000,000 cycles for a single reactor. In some embodiments, n can be about 10, $10^2$, $10^3$, $10^4$, $10^5$, $10^6$, $10^7$, $10^8$, $10^9$, $10^{10}$, $10^{11}$, or $10^{12}$ cycles, or any range of cycles therein, for a single reactor.

The practice of the method includes selecting the first reactant and the second reactant. One of skill will appreciate that the first reactant and second reactant can be any reactant useful in producing a fusion reaction using the methods and systems taught herein. For example, the first reactant and second reactant can each be independently selected from the group consisting of deuterium, tritium, and helium-3, boron-11, lithium-6, and a proton, in some embodiments. In some embodiments, the first reactant and the second reactant are independently selected from the group consisting of deuterium, tritium, and helium. In some embodiments, the first reactant is deuterium and the second reactant is tritium. In some embodiments, the first reactant is deuterium and the second reactant is deuterium. In some embodiments, the first reactant is tritium and the second reactant is tritium. In some embodiments, the first reactant is deuterium and the second reactant is helium-3. In some embodiments, the first reactant is helium-3 and the second reactant is helium-3. In some embodiments, the first reactant is a proton and the second reactant is boron-11. And, in some embodiments, the first reactant is a proton and the second reactant is lithium-6.

One of skill will appreciate that the pressure in the reaction chamber can be varied to any pressure that one of skill will find useful in the methods and systems provided herein. For example, the pressure in the evacuated reaction chamber can range from about $10^{-4}$ torr to about $10^{-9}$ torr in some embodiments, and from about $10^{-6}$ torr to about $10^{-9}$ torr in some embodiments. In some embodiments, the pressure in the evacuated reaction chamber can be about $10^{-3}$ torr, about $10^{-4}$ torr, about $10^{-5}$ torr, about $10^{-6}$ torr, about $10^{-7}$ torr, about $10^{-8}$ torr, about $10^{-9}$ torr, or any range therein. It should be appreciated that the high vacuum conditions existing in the reaction chamber permit the use of high purity reactants that result in an optimized fusion reaction. The term "purity" can be referred to as the absence of the reaction product helium-4 from the prior reaction remaining in the trajectory of the reactants entering the reaction chamber. The purity is obtained by evacuating the reaction chamber between fusion cycles. Likewise, the kinetic energy of the reactants traveling to the target cathode for collision is also optimized by the high vacuum condition, because the reactants are likewise allowed to accelerate while remaining unimpeded by the helium-4 product remaining in the reaction chamber from the prior cycle. Moreover, one of skill will understand that any appropriate vacuum system can be used. For example, such a system can be composed of conventional components. In some embodiments, turbomolecular or diffusion high vacuum pumps backed by rotary vane pumps may be used for the evacuation of the reaction chamber. A Roots-type blower pump may also be used, in some embodiments, to assist in the evacuation of the reaction chamber. In some embodiments, an appropriate vacuum system operation for transient conditions may include (i) a pumpdown with a venting to atmospheric pressure to eliminate a back-diffusion of vacuum pump lubricants to assure a contamination-free reaction chamber condition. In some embodiments the vacuum pump system can include three vacuum pumps in series, a high vacuum pump such as a turbomolecular or diffusion pump, backed by a Roots-type pump, backed by a rotary vane or piston-type pump.

One of skill will appreciate that the positioning of the first reactant port and the second reactant port, relative to the placement of the target cathode, can be varied. For example, the distance from a reactant port to the target can be selected by considering various system parameters, such as duty cycle, duty cycle number, duty cycle frequency, and the like; power applied to the system, power applied for a voltage, power applied for the electric field, power applied for the converging, power output measured, power output desired, and the like; maintenance, number and frequency of maintenance cycles used, number and frequency of maintenance cycles desired, and the like; performance, performance measured, performance of power output, performance desired, and any performance specification in general. Analogous to a combustion engine, the timing of the relative release of the first reactant and second reactant can be adjust to "tune" the fusion "engine". The relative amount of each injection, relative timing of each injection, relative pressure of injection, relative frequency of injection, the design of each injector, such as injection nozzle, and the like, are examples of parameters that can be varied and manipulated, along with the first distance and second distance, to optimize the energy output, and other performance parameters. Such tuning of the "fusion engine" (i.e. any system taught herein), for example, can be used to optimize system performance measured in terms of energy output, economy of operation, life of the fusion engine, frequency of maintenance required, profit from the operation, or any combination thereof, in some embodiments.

In some embodiments, the positioning of each of the system components can be adjusted to vary the first distance between the first reactant port and the target cathode and the second distance between the second reactant port and the target electrode. In some embodiments, the first distance and the second distance are at least substantially the same. In some embodiments, the first distance and the second distance are varied to calibrate and synchronize the collision between the cationic first reactant and the cationic second reactant. In some embodiments, the first distance and the second distance can be independently selected to range from about 0.001 meter to about 30 meters, from about 0.01 meter to about 20 meters, from about 0.001 meter to about 10 meters, from about 0.1 meter to about 15 meters, from about 0.1 meter to about 12 meters, or any range therein in increments of 0.1 meter. In some embodiments the first distance and second distance can be independently selected to be about 0.001 meter, about 0.01 meter, about 0.1 meter, about 0.5 meter, about 1.0 meter, about 2.0 meters, about 3.0 meters, about 4.0 meters, about 5.0 meters, about 6.0 meters, about 7.0 meters, about 8.0 meters, about 9.0 meters, about 10.0 meters, about 11.0 meters, about 12.0 meters, about 13.0 meters, about 14.0 meters, about 15.0 meters, about 16.0 meters, about 17.0 meters, about 18.0 meters, about 19.0 meters, about 20.0 meters, or any distance therein in increments of 0.1 meter.

One of skill will also appreciate that the first reactant port and the second reactant port can include a configured nozzle, designed for a particular embodiment. For example, nozzle flow design can be varied to change the shape and speed of the first reactant from the first reactant port and the shape and speed of the second reactant from the second reactant port. In some embodiments, the pulse of the first reactant or the pulse of the second reactant is applied as a convergent flow on the target electrode. In some embodiments, the pulse of the first reactant or the pulse of the second reactant is applied as a divergent flow on the target electrode. And, in some embodiments, the pulse of the first reactant or the pulse of the second reactant is applied as a fan pattern on the target electrode.

The reactant injectors can be designed for the injection of a particular reactant, to vary the amount, speed, configuration, or direction of injection, and the like. Any parameter associated with an injector can be varied, including pressure of injection, amount of reactant feed to the injector, the dwell time of the injection, and the like. This adjustment of amount injected and dwell time of injection might be considered somewhat analogous to the fuel injection system and cam design of a combustion engine. For at least these reason, one of skill will appreciate that the nozzle design can be independently selected for each of the first injector and the second injector. For example, the first injector can be configured for injecting deuterium and the second injector can be configured for injecting tritium. Likewise, the first injector can be configured for injecting deuterium and the second injector can be configured for injecting deuterium. Moreover, the first injector can be configured for injecting tritium and the second injector can be configured for injecting tritium.

In some embodiments, the opening and closing of the valve that feeds an injector can be referred to as a valve actuation cycle that includes opening the valve to a fully open position, maintaining the open position for a brief interval of time resulting in the steps of the first reactant and the second reactant entering the reaction chamber, the first reactant and the second reactant ionizing, the first reactant and the second reactant accelerating to the target cathode, the first reactant and the second reactant fusing to create fusion energy, and then the valve closing and staying closed until the start of the next cycle. The dwell time of a reactant feed through an injector, for example, the first injector or the second injector, is a variable that controls the time it takes to open the valve, how long the valve stays open, and the time it takes to close the valve. As such, the dwell time can be adjusted to control how much reactant enters the reactant chamber. In some embodiments, the dwell time to open a valve to feed an injector can range from about 0.01 millisecond to about 100 milliseconds, from about 0.1 millisecond to about 10 milliseconds, from about 1.0 millisecond to about 10 milliseconds, from about 0.1 millisecond to about 5 milliseconds, from about 0.01 millisecond to about 1.0 millisecond, or any range therein in increments of 0.01 millisecond. In some embodiments, the dwell time to maintain the open valve to feed an injector can range from about 0.01 millisecond to about 100 milliseconds, from about 0.1 millisecond to about 10 milliseconds, from about 1.0 millisecond to about 10 milliseconds, from about 0.1 millisecond to about 5 milliseconds, from about 0.01 millisecond to about 1.0 millisecond, or any range therein in increments of 0.01 millisecond. In some embodiments, the dwell time to close a valve that feeds an injector can range from about 0.01 millisecond to about 100 milliseconds, from about 0.1 millisecond to about 10 milliseconds, from about 1.0 millisecond to about 10 milliseconds, from about 0.1 millisecond to about 5 milliseconds, from about 0.01 millisecond to about 1.0 millisecond, or any range therein in increments of 0.01 millisecond. In some embodiments the dwell time can refer to a "total dwell time", which is the sum of the time to open, time remaining open, and time to close the valve. As such, in some embodiments, the total dwell time can also refer to a range of about 0.03 milliseconds to about 300 milliseconds, from about 0.01 millisecond to about 100 milliseconds, from about 0.1 millisecond to about 10 milliseconds, from about 1.0 millisecond to about 10 milliseconds, from about 0.1 millisecond to about 5 milliseconds, from about 0.01 millisecond to about 1.0 millisecond, or any range therein in increments of 0.01 millisecond.

Likewise, one of skill will also appreciate that the negative charge on the target cathode can likewise be varied, increasing the electron density on the cathode apart from the voltage, to have further calibration and synchronization control over the collision between the cationic first reactant and the cationic second reactant at the target cathode. Moreover, one of skill can vary the first distance, the second distance, as well as the charge on the target cathode to calibrate and synchronize the collision between the cationic first reactant and the cationic second reactant. One of skill will appreciate that this calibration and synchronization of collisions might be considered somewhat analogous to the timing the fuel input, ignition, and position of the piston in the combustion chamber to optimize the performance of a combustion engine.

One of skill will appreciate that the target cathode can be constructed of a variety of different materials. For example, the target cathode can be any conducting material. In some embodiments, the target cathode can comprise a metal. In some embodiments, for example, the target cathode can be comprised of aluminum or an aluminum alloy. In some embodiments, the target cathode can be comprised of a metal selected from the group consisting of aluminum, antimony, barium, bismuth, boron, carbon (e.g., amorphous, diamond, graphene, graphite), cadmium, calcium, chromium, cobalt, copper, gold, iridium, iron, lead, magnesium, manganese, mercury, molybdenum, nickel, platinum, potassium, rhenium, silver, sodium, steel, tantalum, tellurium, tin, titanium, tungsten, uranium, vanadium, zinc, and alloys thereof. The target cathode can comprise a semiconductor or conductive polymer, in some embodiments. In some embodiments, the target can comprise water or a conductive plasma.

In some embodiments, one or more shields can be used to protect the first reactant port and the second reactant port from the heat and/or products of the fusion reaction. As such, in some embodiments, the systems can further comprise a shield between the first injector and the target electrode, between the second injector and the target electrode, or a combination thereof.

Figure 4A:
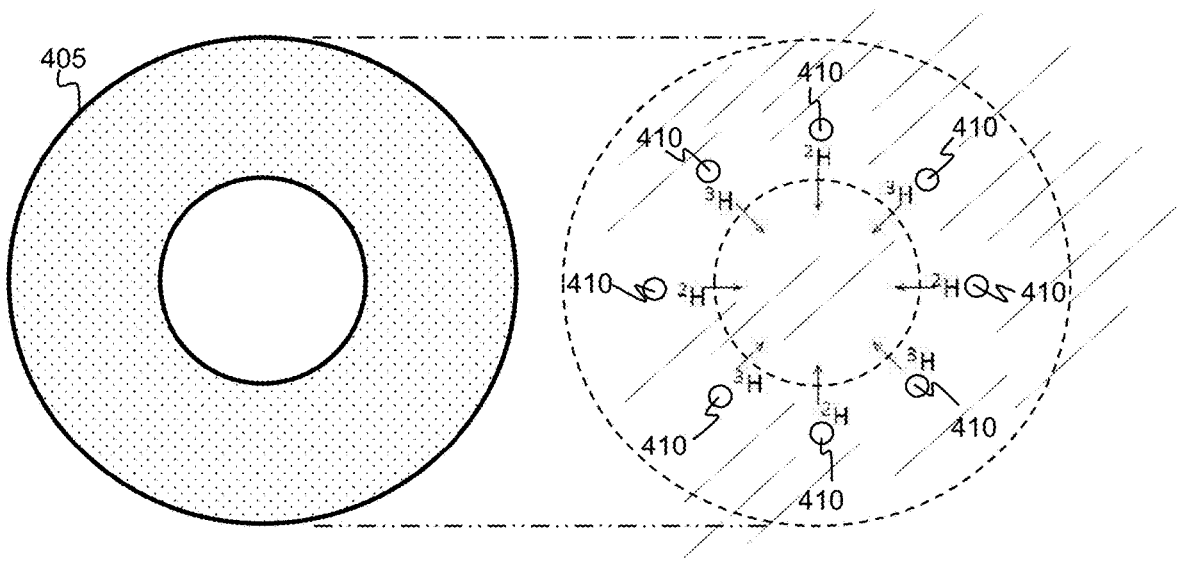
FIGS. 4A and 4B illustrate a reactor node having multiple reactant ports protected by a reactant nozzle shield in a system and method for obtaining nuclear fusion energy using a high energy charged particle collision, according to some embodiments.
Figure 4B:
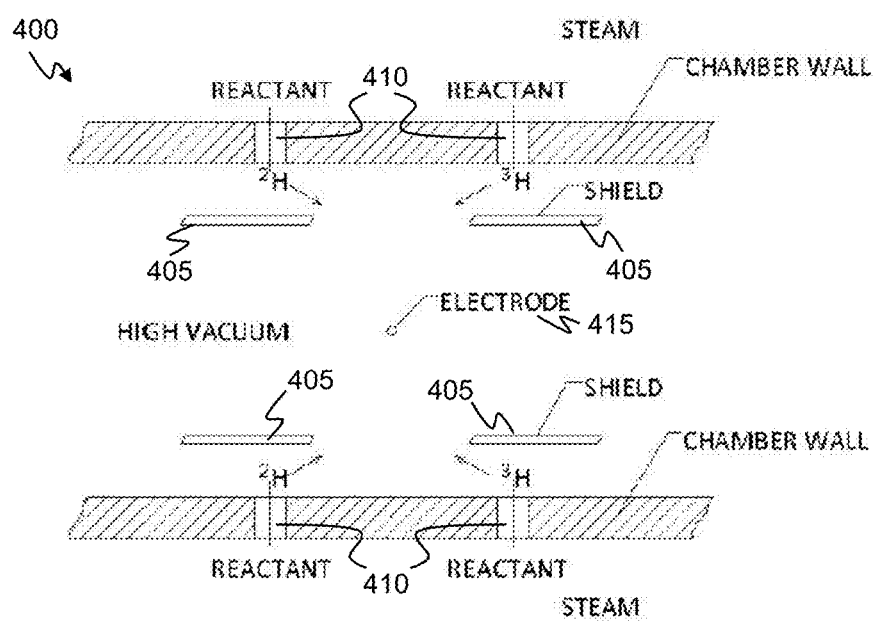

FIGS. 4A and 4B illustrate a reactor node having multiple reactant ports protected by a reactant nozzle shield in a system and method for obtaining nuclear fusion energy using a high energy charged particle collision, according to some embodiments. FIG. 4A illustrates an expanded view of a shield 405 that is used to protect multiple reactant ports, each of which are used for inducing pulses of reactants, such as deuterium, $^2$H, and tritium, $^3$H, into a reaction chamber (not shown). The shield 405 protects the multiple reactant ports 410 from the output of the fusion reaction to avoid any deleterious effects on the reactant ports including, for example, the deposition of neutrons or damage from direct exposure to the exothermic output from the fusion. FIG. 4B is a cross-sectional view of a reaction chamber 400 of the use of the shield 405 to protect multiple reactant ports inside the reaction chamber 400. As shown the pulses of reactants that include the deuterium, $^2$H, and tritium, $^3$H, which are injected into the reaction chamber 400 and ionized by an electric field to form a cationic deuterium, $^2$H, reactant and a cationic tritium, $^3$H, reactant. The shield 405 protects the multiple reactant ports 410 from the output of the fusion reaction to avoid the deleterious effects on the reactant ports. The electrode 415 carries a negative charge as the target cathode, and the cationic deuterium and cationic tritium converge to the target cathode 415 for collision and fusion. FIG. 4B can be referred to as a single reactor "node", in some embodiments. In some embodiments, a "reactor node" can be defined as having (i) a target cathode; (ii) at least two reactant ports; (iii) a chamber wall for conducting the heat energy out of the reactor vessel; and (iv) an anode to establish the voltage with the target cathode, wherein the anode can be the chamber wall. In some embodiments, a "reactor node" can be defined as having (i) a target cathode; (ii) at least two reactant ports; (iii) a shield to protect the at least two reactant ports; (iv) a chamber wall for conducting the heat energy out of the reactor vessel; and (v) an anode to establish the voltage with the target cathode, wherein the anode can be the chamber wall.

Figure 5:
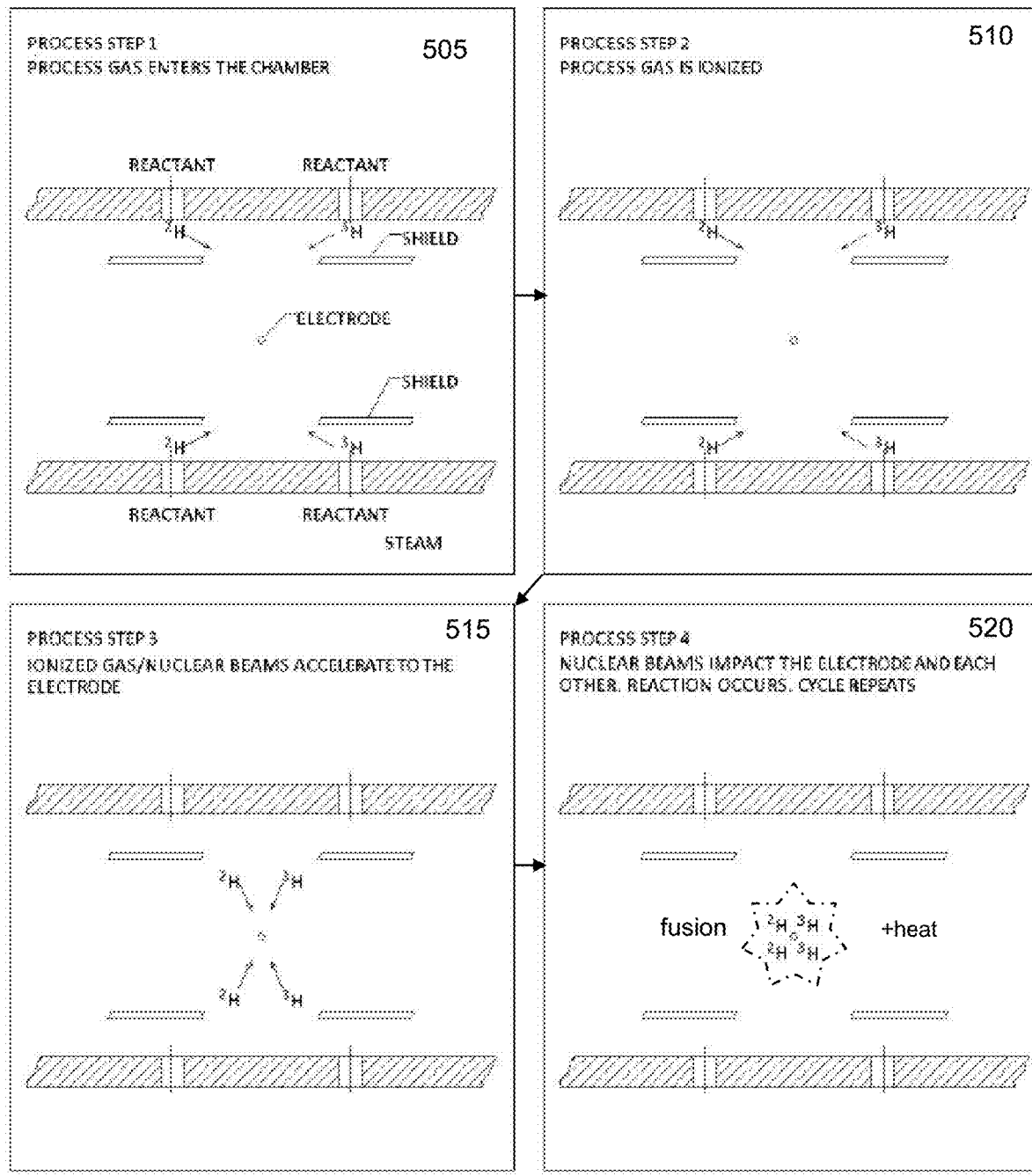
FIG. 5 is a process flow chart for obtaining nuclear fusion energy using a high energy charged particle collision through a reactor node having multiple reactant ports protected by a reactant nozzle shield, according to some embodiments.

FIG. 5 is a process flow chart for obtaining nuclear fusion energy using a high energy charged particle collision through a reactor node having multiple reactant ports protected by a reactant nozzle shield, according to some embodiments. FIG. 5 is a representation of the reactor node of FIG. 4B, using the illustration of FIG. 4B to shown the process steps. In step 1, 505, the reactants enter the reaction chamber the deuterium, $^2$H, and tritium, $^3$H, which are injected into the reaction chamber 400 and are ionized step 2, 510, by an electric field to form a cationic deuterium, $^2$H, reactant and a cationic tritium, $^3$H, reactant. In some embodiments, photonic energy may also be applied to supplement the ionization of the reactants. The cationic deuterium, $^2$H, reactant and a cationic tritium, $^3$H, accelerate to the electrode which is the target cathode 415 in step 3, 515. The shield 405 protects the multiple reactant ports 410 from the output of the fusion reaction that occurs in step 4, 520, to avoid the deleterious effects on the reactant ports 410. The electrode 415 carries a negative charge as the target cathode, and the cationic deuterium and cationic tritium converge to the target cathode 415 for collision and fusion. Steps 1-4, 515-520, represent merely one cycle of fusion. In some embodiments, the fusion reactor has multiple cycles, and the cycles can be separated by an additional step of evacuating the reaction chamber to remove fusion products, such as $^4$He and neutrons, and increase the performance of the next reaction cycle. The neutrons may stick to the walls of the reaction vessel.

A single reactor node can have a single target cathode, in some embodiments. However, in some embodiments, a single reactor node can have more than one target cathode. In some embodiments, for example, a single reactor node might have 2, 3, 4, 5, 6, 7, 8, 9, 10, or more target cathodes. In some embodiments, a single reactor node can have one or more cage or mesh type target cathodes, a configuration that may be implemented for at least the reasons taught herein. In some embodiments, a reactor vessel can have more than one reactor node. In some embodiments, the reactor vessel can have a single reaction chamber with more than a single node, for example, 2, 3, 4, 5, 6, 7, 8, 9, 10, or more reactor nodes. In some embodiments a reactor vessel can have a single reaction chamber or more than one reaction chamber. In some embodiments, for example, the reactor vessel might have 2, 3, 4, 5, 6, 7, 8, 9, 10, or more reaction chambers. Each reaction chamber in each reactor vessel can have multiple reactor nodes.

Figure 6:
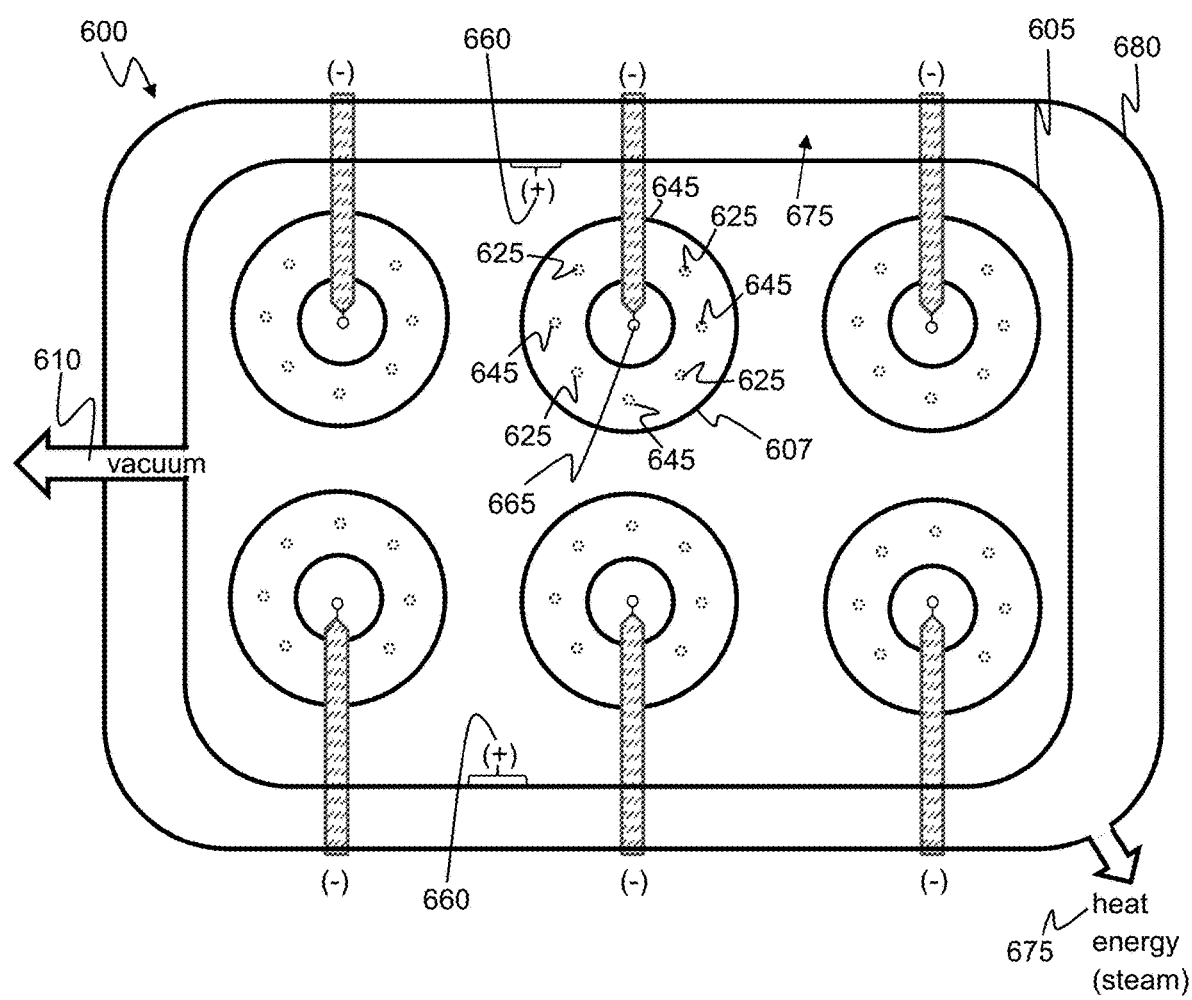
FIG. 6 is a cross-sectional top view (or bottom view) of a multi-node, high vacuum reactor for obtaining nuclear fusion energy using a high energy charged particle collision, each reactor node having multiple reactant ports protected by a reactant nozzle shield and a target electrode, according to some embodiments.

FIG. 6 is a cross-sectional top view (or bottom view) of a multi-node, high vacuum reactor for obtaining nuclear fusion energy using a high energy charged particle collision, each reactor node having multiple reactant ports protected by a reactant nozzle shield and a target electrode, according to some embodiments. In FIG. 6, the multi-node, high vacuum reactor 600 has 6 reactor nodes, only one of which is labeled in the diagram for purposes of clarity, the others serving as merely additional nodes having the same structure for purposes of the illustration. It is possible, however, for each of the nodes to have an independent configuration that is not the same as all other nodes, at least in some embodiments. The system has a single reaction chamber 605 is shared by each of the 6 reactor nodes and configured for evacuation of the reaction chamber 605 to a pressure that is lower than about $10^{-3}$ torr; a vacuum port 610 adapted for an operable connection to a vacuum source (not shown for evacuating the reaction chamber 605 to a pressure that is lower than about $10^{-3}$ torr; a first injector (not shown) in operable communication with a first reactant port 625 for a first reactant (shown in dotted lines behind a shield 607) in the evacuated reaction chamber 605 for inducing a pulse of a first reactant (not shown) into the evacuated reaction chamber 605 through the first reactant port 625; a second injector (not shown) in operable communication with a second reactant port 645 for a second reactant (shown in dotted lines behind a shield 607) in the evacuated reaction chamber 605 for inducing a pulse of a second reactant (not shown) into the evacuated reaction chamber 605 through the second reactant port 645; an anode surface 660 and a cathode surface 665, which in this embodiment is the target cathode, for operably connecting to a voltage source (not shown), the anode surface 660 and the cathode surface 665 positioned in the interior of the reaction chamber 605 to create an electric field in the evacuated reaction chamber 605 upon application of a voltage 660,665, the electric field ionizing the first reactant (not shown) to generate a cationic first reactant (not shown) and ionizing the second reactant (not shown) to generate a cationic second reactant (not shown); a target cathode 665 positioned in the reaction chamber 605 at a first distance (distance between 625 and 665) from the first injector 625 and a second distance (distance between 645 and 665) from the second injector 640, the target cathode 665 configured to function as a negatively charged electrode for attracting and converging the cationic first reactant (not shown) and the cationic second reactant (not shown) at the target cathode 665 for colliding and fusing the cationic first reactant (not shown) with the cationic second reactant (not shown) to create a heat energy 675; a steam chamber 680 in operable contact with the reaction chamber 605, the steam chamber 680 configured for receiving the heat energy (not shown) from the fusion reaction (not shown) in the reaction chamber 605. The voltage applied to attract and converge the reactants at the target cathode 665 can be referred to as the "bias", in some embodiments, indicating the use of voltage to generate a force to transport the cationic reactants (not shown) to the target cathode 665 for the collision and fusion.

Figure 7A:
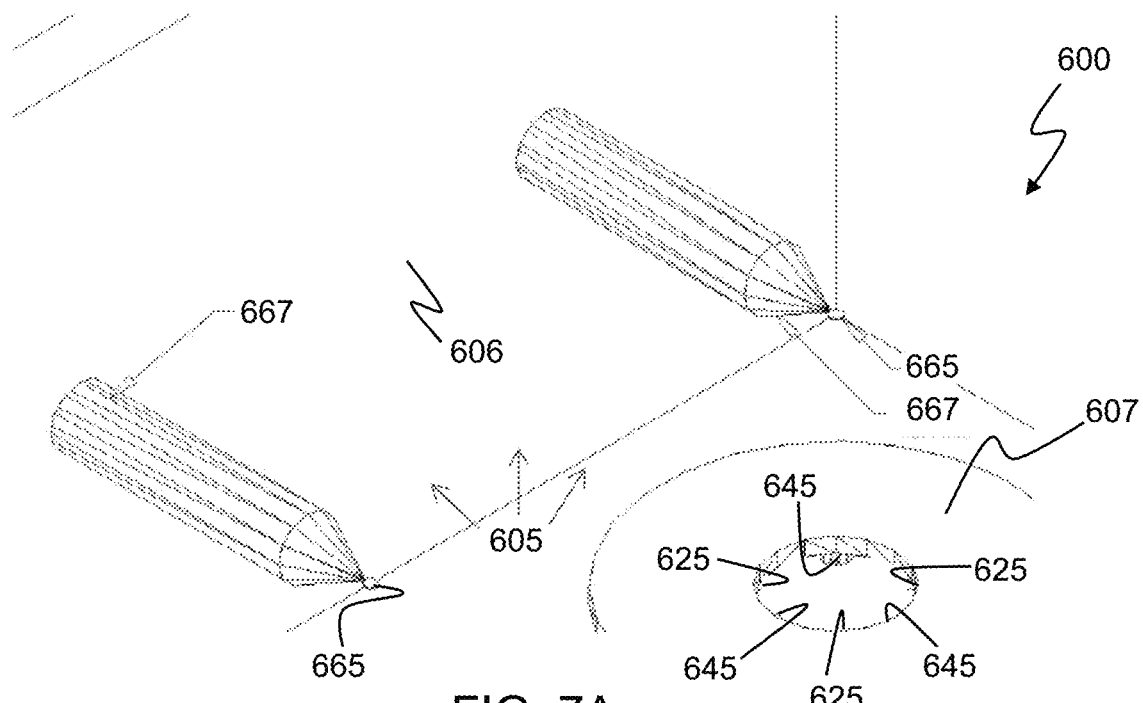
FIGS. 7A-7E include a perspective view of a portion of a multi-node, high vacuum reactor for obtaining nuclear fusion energy using a high energy charged particle collision, each reactor node having multiple reactant ports protected by a reactant nozzle shield and a target electrode, in addition to insulated target electrode assemblies, according to some embodiments.
Figure 7B:
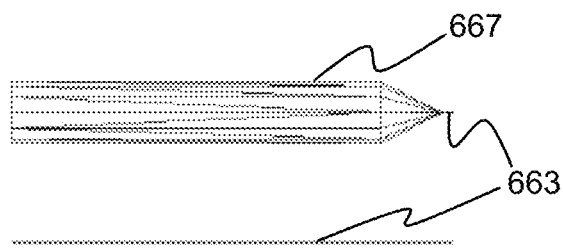
Figure 7C:
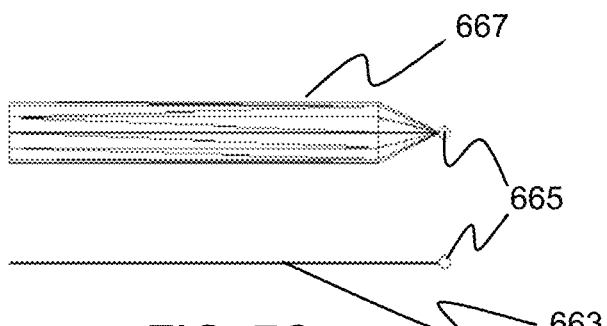
Figure 7D:
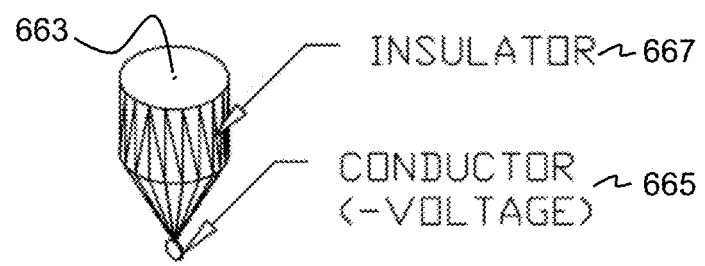
Figure 7E:
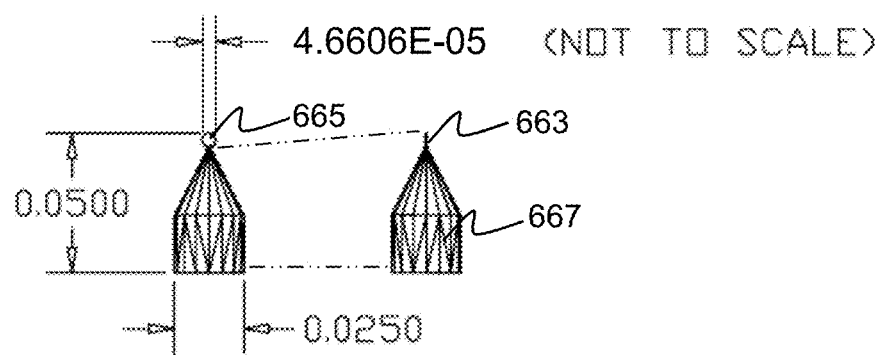

FIGS. 7A-7E include a perspective view of a portion of a multi-node, high vacuum reactor for obtaining nuclear fusion energy using a high energy charged particle collision, each reactor node having multiple reactant ports protected by a reactant nozzle shield and a target electrode, in addition to insulated target electrode assemblies, according to some embodiments. In FIG. 7, the multi-node, high vacuum reactor 600 of FIG. 6 is shown from the perspective view for a better view of the relationship between the target cathode 665 as it relates to its insulator 667, shield 607, the reactant ports 625,645, and the wall 606 of the reaction chamber 605 in each the 6 reactor nodes. FIGS. 7A-7C illustrate an insulator 667 for a conducting wire 663 that is operably connected to the target cathode 665. FIG. 7D illustrate a cross-section of the insulator 667 for the conducting wire 663 that is operably connected to the target cathode 665. FIG. 7E illustrates a side view of the distal end of the insulator 667 for the conducting wire 663 that is operably connected to the target cathode 665. All dimensions shown are not limiting, are for example only, and are in meters.

Figure 8:
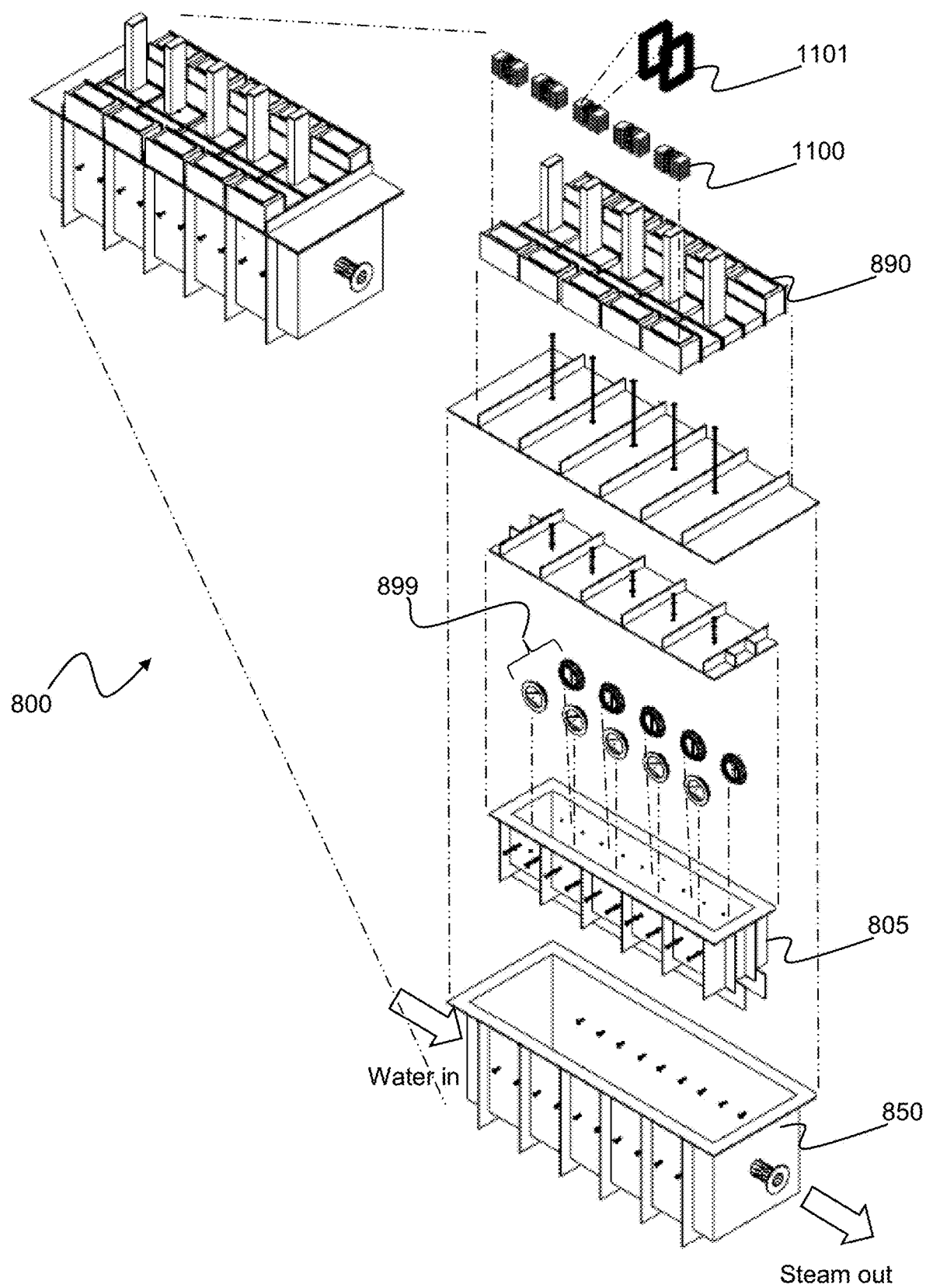
FIG. 8 shows an expanded view of a portion of a multi-node, high vacuum reactor for obtaining nuclear fusion energy using a high energy charged particle collision, including reactor nodes in a high vacuum reactor chamber, reactant injector ports with injector valves for each node, a target tray with cassettes providing replacement target electrodes, and a steam chamber for capturing and moving nuclear fusion energy in the form of steam to a steam turbine to create electricity, according to some embodiments.

FIG. 8 shows an expanded view of a portion of a multi-node, high vacuum reactor for obtaining nuclear fusion energy using a high energy charged particle collision, including reactor nodes in a high vacuum reactor chamber, reactant injector ports with injector valves for each node, a target tray with cassettes providing replacement target electrodes, and a steam chamber for capturing and moving nuclear fusion energy in the form of steam to a steam turbine to create electricity, according to some embodiments. The multi-node, high vacuum reactor 800 has 5 reactor nodes in the high vacuum reactor chamber 805 as can be seen from the illustration. The reactor chamber 805 is surrounded by a steam chamber 850 for the energy capture and transfer of energy to a steam turbine, for example, to produce electricity. A target load/switch-out assembly 890 with cassettes 895 carrying extra target cathodes 865 is also provided. Also included is a set of one type of reactant valves 899 which, in this case are designed as damped deuterium-tritium manifolds with reactant staging regions. It should be appreciated that any valve configuration known to one of skill can be used in the process of inducing a pulse of reactant into the reaction chamber 805. The following FIGS. 9A-13 provide more detail on the components of the multi-node, high vacuum reactor 800. All dimensions shown are not limiting, are for example only, and are in meters.

Figure 9E:
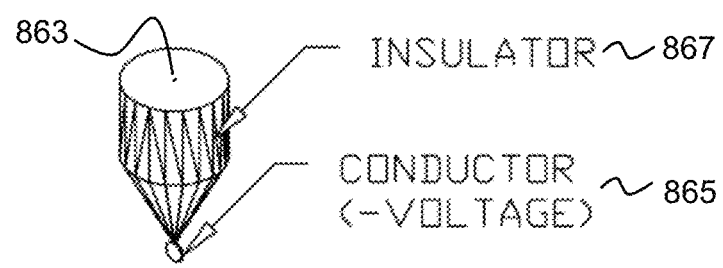
Figure 9F:
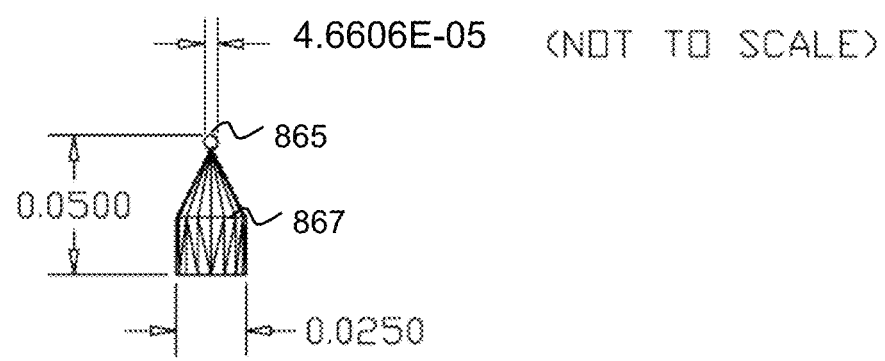

FIGS. 9A-9F shows a multi-node, high vacuum reactor chamber having reactant injector ports for each node, and an insulated target electrode used in each node, according to some embodiments. FIG. 9A is an expanded view of the reactor chamber 805, including the first injector port 813 and second injector port 815. The reactor chamber 805 includes reinforcing ribs 823 to provide strength to the reactor chamber 805 under the extreme temperature and pressure from the fusion reaction. The reactor chamber 805 lid 809 also has the reinforcing ribs 823, as well as the insulator 867 for the conducting wire (not shown) that is operably connected to the target cathode (not shown). FIG. 9B is an end-view of the reactor chamber 805, FIG. 9C is a side-view of the reactor chamber 805, and FIG. 9D is a side-view of the lid 809. FIGS. 9E and 9F illustrate a perspective view and a side view of the distal end of the insulator 867 for the conducting wire 863 that is operably connected to the target cathode 865. All dimensions shown are not limiting, are for example only, and are in meters.

FIGS. 10A-10D illustrate a target load/switch-out assembly with cassettes providing replacement target electrodes for 5 reactor nodes, according to some embodiments. FIG. 10A illustrates a perspective view of the target load/switch-out assembly 890. The target load/switch-out assembly 890 provides new target cathodes for each reaction cycle, replacing the target cathode consumed in the prior cycle. The replacement target cathodes can be supplied automatically at atmospheric conditions but are transferred to the reaction chamber nodes at high vacuum pressure levels. The target load/switch-out assembly contains the following components: a cassette loading chamber (qty 5; one for each node) 891, a first buffer chamber 892 (qty 5; one for each node), a target transfer chamber 893 (qty 5; one for each node), a second buffer chamber 894 (qty 5; one for each node), and a cassette unload chamber 895 (qty 5; one for each node). The progression 896 of changing the target cathode (not shown) follows the general path in the component series from the cassette loading chamber 891 (shown with door 891D open) to the buffer chamber 892 to the target transfer chamber 893 to the buffer chamber 894, and finally to the cassette unload chamber 895. The target load/switch-out assembly 890 also contains a target transfer actuator housing 897 containing an actuator 898 for each one of the reactor nodes 1-5. In FIG. 10A, the identifiers "Node 1", "Node 2", "Node 3", "Node 4", and "Node 5" identifier the tray progression 896 lanes for each of nodes 1-5. FIG. 10B shows an end-view of the target load/switch-out assembly 890. FIG. 10C shows a top-view of the target load/switch-out assembly 890. FIG. 10D shows a side view of the target load/switch-out assembly 890. All dimensions shown are not limiting, are for example only, and are in meters.

Figure 11A:
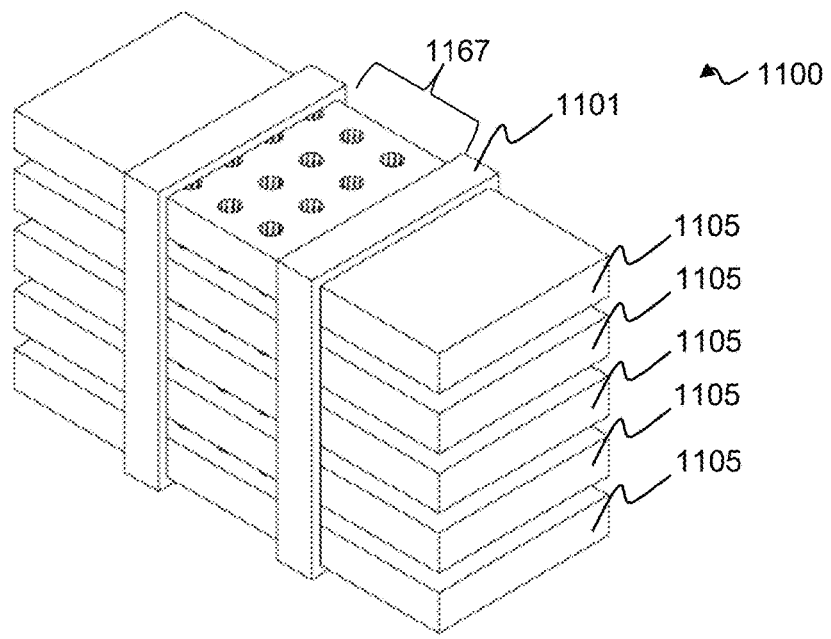
FIGS. 11A-11D illustrate cassettes for the target tray for changing out the spent target cathodes from each fusion reaction, each cassette providing 5 trays, each of the 5 trays providing sixteen (16) replacement target electrodes, according to some embodiments.
Figure 11B:
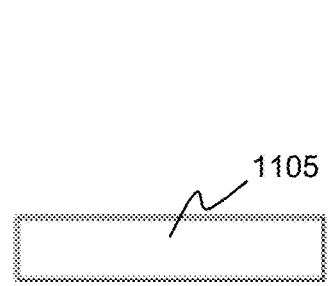
Figure 11C:
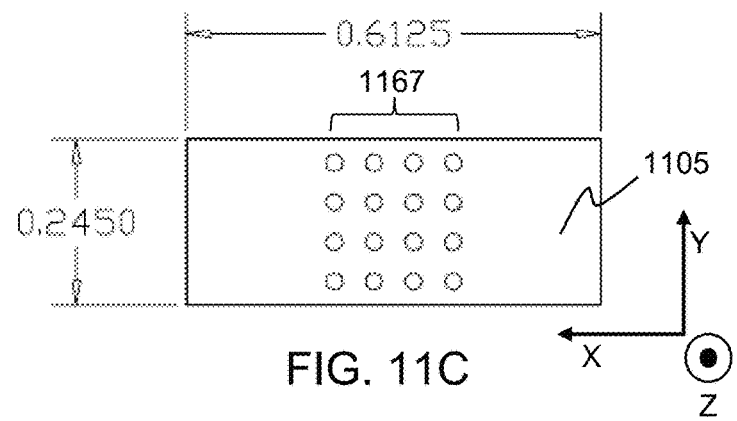
Figure 11D:
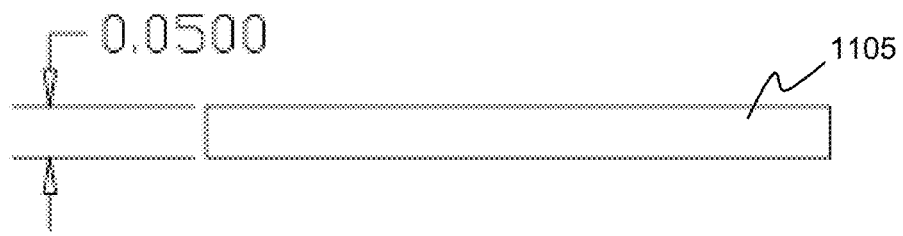

FIGS. 11A-11D illustrate cassettes for the target load/switch-out assembly 890 for changing out the spent target cathodes from each fusion reaction, each cassette providing five (5) target trays, each of the 5 target trays providing sixteen (16) replacement target electrodes, according to some embodiments. FIG. 11A shows a target tray cassette 1100 containing five (5) target trays 1105, each target tray 1105 containing sixteen (16) target cathodes 1167. FIG. 11B shows an end-view of the target tray 1105. FIG. 11C shows a top-view of the target tray 1105. FIG. 11D shows a side-view of the target tray 1105. The target cassette 1100 can be held together using any operable means such as, for example, by a tray frame or scaffolding 1101.

The cassette loading chamber 891 is configured to receive the target cassette 1100 through a door 891D. The cassette loading chamber 891 is also configured to be evacuated to intermediate vacuum levels (significantly below atmospheric but above $10^{-3}$ torr). After evacuation, the cassette loading chamber 891 then feeds target trays 1105 into the first buffer chamber 892 which is configured to provide additional outgassing of the target tray 1105 and it's replacement target cathodes 1167. The target tray 1105 moves from the first buffer chamber 892 into the target transfer chamber 893. The target tray 1105 is then indexed in x-y directions in the target transfer chamber 893 to align each of the 16 target cathodes 1167 with the actuator 898 which moves the respective replacement target cathode in the z-direction through the target transfer actuator housing 897 to transfer the respective replacement target cathode 1167 into the reactor chamber. In some embodiments, for example, the respective replacement target cathode 1167 is moved into the reactor chamber, and any remains of the spent target cathode can be retrieved. The target tray 1105 is then progressed into the second buffer chamber 894 and then the cassette unload chamber 895 which can function to accept an unloaded target cassette frame 1101 at atmospheric pressure, evacuate to intermediate vacuum levels, receive target trays 1105 into the target cassette frame 1101, potentially having remainders of spent targets from the second buffer chamber 894 for removal from the system. This target replacement process can be repeated for each cycle at each of the 5 nodes. It should be appreciated that the mechanism of target cathode transfer can be any mechanism, there can be any number of nodes, and that this mechanism is merely an example of the cyclic process of replacing spent target cathodes in the reaction chamber for a sustained series of fusion reactions.

FIGS. 12A-12D illustrate a steam chamber for capturing and moving nuclear fusion energy in the form of steam to a steam turbine to create electricity, according to some embodiments. FIG. 12A shows an expanded view of the steam chamber 850 with lid 859. The steam chamber 850 is also designed to accommodate the five (5) reactor nodes of the high vacuum reactor chamber 805 as can be seen from the illustration. The reactor chamber 805 is surrounded by the steam chamber 850 for the energy capture and transfer of energy to a steam turbine, for example, to produce electricity. Water goes into the steam chamber 850 and leaves as steam out of the steam chamber 850, as illustrated. A target load/switch-out assembly 890 with cassettes 895 carrying extra target cathodes 865 is also provided. The steam chamber 850 must also be designed to accommodate the passage of the first injector port 813 and second injector port 815 into the reaction chamber 805 (only one side is marked in FIG. 12A for clarity, but the other side is complementary and can be assumed to be a mirror image of the marked side). Like the reactor chamber 805, the steam chamber 850 also includes reinforcing ribs 823 to provide strength to the reactor chamber 805 under the extreme temperature and pressure from the fusion reaction. The steam chamber lid 859 also has the reinforcing ribs 823, as well as the insulator 867 for the conducting wire (not shown) that is operably connected to the target cathode (not shown). FIG. 12B is an end-view of the steam chamber 850, FIG. 12C is a side-view of the steam chamber 850, and FIG. 12D is a side-view of the lid 859. All dimensions shown are not limiting, are for example only, and are in meters.

Figure 13:
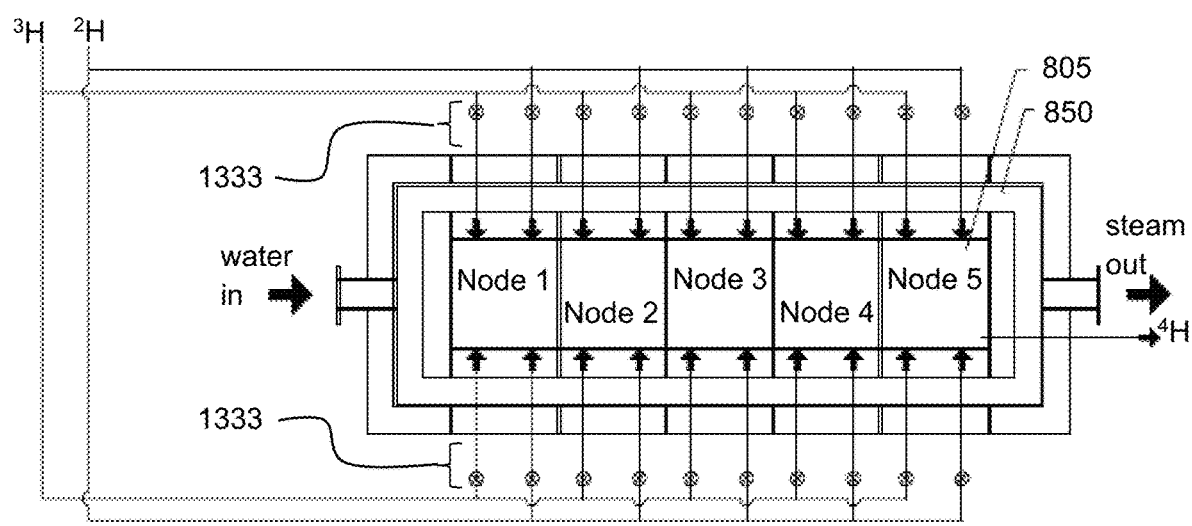
FIG. 13 illustrates a cross-sectional bottom view of a multi-node, high vacuum reactor for obtaining nuclear fusion energy using a high energy charged particle collision, including reactor nodes in a high vacuum reactor chamber, reactant injector ports for each node, and a steam chamber for capturing and moving nuclear fusion energy in the form of steam to a steam turbine to create electricity, according to some embodiments.

FIG. 13 illustrates a cross-sectional bottom view of a multi-node, high vacuum reactor for obtaining nuclear fusion energy using a high energy charged particle collision, including reactor nodes in a high vacuum reactor chamber, reactant injector ports for each node with mass flow controllers, and a steam chamber for capturing and moving nuclear fusion energy in the form of steam to a steam turbine to create electricity, according to some embodiments. The five (5) node reactor can use conventional mass flow controllers 1333 to provide precise reactant flow into the reactant chamber 805. The mass flow controllers 1333 can be calibrated to complement the reactant valves 899 which, in this case are designed as the damped deuterium-tritium manifolds with reactant staging regions. The process gas flow is illustrated, with the deuterium, $^2H$, and the tritium, $^3H$, flowing through the mass flow controllers 1333 and into the reaction chamber 805 for the fusion reaction that produces the energy that converts the "water in" to the "steam out" as illustrated to drive a steam turbine (not shown) and generate electricity. Also illustrated is the evacuation of helium-4, $^4H$, from the reaction chamber 805.

Without intending to be limited to any theory or mechanism of action, the following examples are provided to further illustrate the teachings presented herein. It should be appreciated that there are several variations contemplated within the skill in the art, and that the examples are not intended to be construed as providing limitations to the claims.

EXAMPLE 1

Calculating a Fuel Flow Rate

The equation describing the energy balance for a representative 2 gigawatt (GW) power plant is as follows and assumes a 100% utilization of reactants:

$$17.6 \text{ MeV } 2_H \text{ (single molecule)} + 3_H \text{ (single molecule)} = 2.8198 \times 10^{-18} \text{ megajoule} \quad (\text{ref: 1})$$

$$2 \text{ GWatt} = (2.8198 \times 10^{-18} \text{ megajoule}) * (x/\text{sec})[2_H \text{ (single molecule)} + 3_H \text{ (single molecule)}]$$

$$(x/\text{sec})[2_H \text{ (single molecule)} + 3_H \text{ (single molecule)}] = 7.0926 \times 10^{20}/\text{sec}$$

$$(x/\text{sec})[2.0141 \, u2_H + 3.0160 \, u3_H] = 7.0926 \times 10^{20}/\text{sec}$$

$$(x/\text{sec})[3.3234 \times 10^{-24} \text{ gram } 2_H + 5.0082 \times 10^{-24} \text{ gram} 3H]$$

$$= (2.3572 \text{ milligram } 2_H + 3.5522 \text{ milligram} 3_H)/\text{sec}$$

$$= [2.3572 \text{ milligram } 2_H \, (22.4 \text{ liter}/2.0141 \text{ gram} 2_H/ + 3.5522 \text{ milligram } 3_H \, (22.4 \text{ liter}/3.0160 \text{ gram} 3_H)]/\text{sec}$$

$$= (0.02622 \text{ liter } 2_H + 0.02638 \text{ liter } 3_H)/\text{sec}$$

Accordingly, for a 2 GW power plant, the fuel flow rate should be approximately=1572.9 sccm$2_H$+1582.9 sccm$3_H$!!

Where:
x/sec=parameter representing the number of 2H+3H reactions required per second to generate 2GWatt
ex=10 to the x power
MeV=Mega electron volt (energy)
$2_H$=Deuterium
$3_H$=Tritium
GWatt=gigawatt (power, energy/time)
1 electronvolt=1.6021773×10$^{-19}$ joule
1 watt=1 joule/second
1 u=1 unified atomic mass unit=1.660538921×10$^{-24}$ gram
1 Mole of gas=6.022×10$^{23}$ atoms or molecules=22.4 liters at standard conditions (23C, 760 Torr (14.7 psi))
sccm=standard cubic centimeter per second flow rate (standard industry measure of flow rate)

EXAMPLE 2

Calculating Relative Locations for the Reactant Injectors and Target Cathode

One of skill will appreciate that the location of the injectors for the two reactants is determined by their transport time to target. This interval is determined by their mass (resisting acceleration) and their ionization (producing force causing acceleration. The governing equation of rectilinear motion is:

$$s = 1/2at^2$$

Where:
s=distance from reactor induction to target
a=acceleration due to the unbalanced force of the ionized reactants in the electromagnetic field
t=the time of transport from the site of induction to the target The distance for the 2 reactants to the target can be the same, for example, due to the complimentary inverse relationship of mass to ionization—2/3 ratio for mass and 3/2 ratio for force due to relative ionization.

EXAMPLE 3

Calculating Target Cathode Size

One of skill will appreciate that the size of the target cathode should be related to the reactant flow for the reactor, the number of reaction nodes, the output of the reactor, and the size of the reactant nuclei. A configuration that offers a basis for establishing the physical reaction is a monolayer of reactant nuclei covering the faces of the electrode being impacted, recognizing that reactions adjacent to the target are anticipated either from same-side same-direction reactant collision or opposite-side opposite-direction reactant collision. This high density nuclear condition is unique to the teachings provided herein, and it produces a high reaction efficiency, as well as overcomes the inherent limitations in other unsatisfactory development paths at other facilities/programs.

The true sizes of the atomic and nuclear species under discussion are dependent upon Bose Einstein Condensate behavior of the ionized bosons dependent on local momentum distribution ("temperature"), energy density conditions, and energy state.

Referring to the calculated fuel flow rate:

$$(x/\text{sec})[2_H \text{ (single molecule)} + 3_H \text{(single molecule)}] = 7.0926 \times 10^{20}/\text{sec}$$

And, using the area of the reactants, and assuming a one reaction per second reactor frequency, gives:

$$7.09261 0^{20}[(2_H \text{ (single molecule)} + 3_H \text{ (single molecule)}] \times (2) \times (9.6211 \times 10^{-30} \text{ m}^2) = 1.3648 \times 10^{-8} \text{ m}^2$$

So for a 2 sided disc shaped target, the radius is ideally:

$$r = \sqrt{[(1.3648 \times 10^{-8}/2\pi)]} = 4.6606 \times 10^{-5} \text{ m, or for a square target}$$

$$l = \sqrt{(1.3648 \times 10^{-8})} = 1.1682 \times 10^{-4} \text{ m}$$

Where:

Average estimated area of reactants is $\pi[2 \times 1.75 \text{ fm}(1.75 \times 10^{-15})]$ squared$/4 = \pi[3.5 \times 10^{-15}]$ squared$/4 = 9.6211 \times 10^{-30}$ m$^2$.

The diameter of the nucleus is in the range of 1.75 fm ($1.75 \times 10^{-15}$ m) for hydrogen (the diameter of a single proton) to about 15 fm for the heaviest atoms, such as uranium. These dimensions are much smaller than the diameter of the atom itself (nucleus+electron cloud), by a factor of about 23,000 (uranium) to about 145,000 (hydrogen).

Moreover, it should be appreciated that, under the conditions in the reactor chamber during fusion, the target will/may evaporate after each reaction and replacement will/may be needed.

EXAMPLE 4

Sizing the Reactor

The reaction chamber should be sized appropriately for the desired energy transfer, meaning that the exothermicity of the higher reaction efficiencies should be translated into the heat transfer surface area needed to maintain an efficient steady state process.

Heat transfer through the high vacuum reaction chamber to the steam vessel is required to drive conventional turbines to generate electrical power. As such, it is the heat transfer through the chamber, maintenance and fabrication, and the reaction process that govern optimum chamber dimensions.

Using conventional light water reactor general parameters as a reference, for example, a 2GW Nuclear Fusion Power Plant Reactor would have 4 chamber modules each having a nominal 54 m$^2$ surface area. Heat transfer levels into the chamber wall from the reaction will not be excessive resulting in chamber failure. A high vacuum reaction chamber failure mode could manifest as a leak—where the heat transfer medium, steam, or atmospheric air enters the chamber and prevents the high vacuum conditions required for the process.

I claim:

1. A method of producing a cyclic nuclear fusion reaction in a multi-node, nuclear fusion reactor, the method comprising:
   starting and completing a first cycle of a nuclear fusion reaction in a first reactor node in a reaction chamber of a multi-node, nuclear fusion reactor, the starting and completing including
      evacuating the reaction chamber to a pressure that is lower than about $10^{-3}$ torr;
      inducing a pulse of (i) a first reactant into the evacuated reaction chamber through a first reactant port and a pulse of (ii) a second reactant into the evacuated reaction chamber through a second reactant port, wherein the first reactant and the second reactant are independently selected as comprising deuterium or tritium;
      converging the first reactant with the second reactant at a target cathode for colliding and fusing the first reactant with the second reactant to create a heat energy, the converging creating a higher reaction density at the target cathode rather than relying on random collisions, and including
      creating an electrical field in the reaction chamber by applying a voltage that is selected from the group consisting of about 10 kV, about 11 kV, about 12 kV, about 13 kV, about 14 kV, about 15 kV, about 20 kV, about 25 kV, about 30 kV, about 35 kV, about 40 kV, about 45 kV, about 50 kV, about 60 kV, about 70 kV, about 80 kV, about 90 kV, about 100 kV, about 200 kV, about 300 kV, about 400 kV, about 500 kV, about 600 kV, about 700 kV, about 800 kV, about 900 kV, about 1MV, about 2MV, about 3MV, about 4MV, about 5MV, about 10MV, or any voltage therein, or range of voltages therein, in increments of 1 kV, across an anode surface positioned in the interior of the reaction chamber and a surface of the target cathode positioned in the interior of the reaction chamber, the surface area of the target cathode ranging from about from about $1.00 \times 10^{-10}$ m$^2$ to about $1.00 \times 10^{-6}$ m$^2$, the electric field ionizing the first reactant to generate a cationic first reactant and ionizing the second reactant to generate a cationic second reactant; and,
      establishing a negative charge on the target cathode for attracting and converging the cationic first reactant and the cationic second reactant at the target cathode for colliding and fusing the cationic first reactant with the cationic second reactant to create the heat energy; and,
   repeating the starting and completing for a second cycle of a nuclear fusion reaction in a second reactor node in the reaction chamber, wherein the repeating provides the cyclic nuclear fusion reaction in the multi-node, nuclear fusion reactor.

2. The method of claim 1, wherein the first reactant is deuterium and the second reactant is tritium.

3. The method of claim 1, wherein deuterium is both the first reactant and the second reactant.

4. The method of claim 1, wherein tritium is the first reactant and tritium is the second reactant.

5. The method of claim 1, further comprising adjusting the pressure in the evacuated reaction chamber to range from about $10^{-4}$ torr to about $10^{-9}$ torr.

6. The method of claim 1, further comprising adjusting the pressure in the evacuated reaction chamber to range from about $10^{-6}$ torr to about $10^{-9}$ torr.

7. The method of claim 1, further comprising:
replacing the target cathode in the first reactor node with a first replacement target cathode to complete the first cycle of the nuclear fusion method in the reactor; and,
replacing the target cathode in the second reactor node with a second replacement target cathode to complete the second cycle of the nuclear fusion method in the reactor.

8. The method of claim 7, wherein:
the replacing of the target cathode in the first reactor node with the first replacement target cathode includes progressing the first replacement cathode to a first target transfer chamber for the first node; and,
the replacing of the target cathode in the second reactor node with the second replacement target cathode includes progressing the second replacement cathode to a second target transfer chamber for the second node.

9. The method of claim 1, further comprising:
replacing of the target cathode in the first reactor node with a first replacement target cathode, wherein the replacing includes progressing the first replacement cathode from a first cassette loading chamber to a first target transfer chamber for the first node; and,
replacing of the target cathode in the second reactor node with a second replacement target cathode, wherein the replacing includes progressing the second replacement cathode from a second cassette loading chamber to a second target transfer chamber for the second node.

* * * * *